United States Patent [19]

Klinefelter et al.

[11] Patent Number: 5,636,331
[45] Date of Patent: Jun. 3, 1997

[54] PATTERNED INTENSITIES PRINTER

[75] Inventors: Gary M. Klinefelter, Eden Prairie; Michael R. Tolrud, Chaska, both of Minn.

[73] Assignee: Fargo Electronics, Inc., Eden Prairie, Minn.

[21] Appl. No.: 668,325

[22] Filed: Jun. 26, 1996

Related U.S. Application Data

[63] Continuation of Ser. No. 65,816, May 21, 1993.

[51] Int. Cl.[6] ........................................ G06K 15/00
[52] U.S. Cl. ................................ 395/109; 347/193
[58] Field of Search .................... 395/101, 104, 395/109, 114–116; 400/120.01, 120.02, 120.03, 120.05, 120.07, 120.11, 120.13; 358/296, 298, 534, 535, 540; 347/176–178, 180–182, 188–189, 191, 192–194, 195, 196

[56] References Cited

U.S. PATENT DOCUMENTS

| | | | |
|---|---|---|---|
| 4,071,849 | 1/1978 | Koyano et al. | 346/1 |
| 4,300,142 | 11/1981 | Kos | 346/76 |
| 4,368,491 | 1/1983 | Saito | 358/283 |
| 4,399,749 | 8/1983 | Arai | 346/76 PH |
| 4,464,669 | 8/1984 | Sekiya et al. | 346/76 |
| 4,475,114 | 10/1984 | Koyama et al. | 358/296 |
| 4,679,055 | 7/1987 | Inui et al. | 46/76 |
| 4,701,811 | 10/1987 | Moriguchi et al. | 358/298 |
| 4,724,446 | 2/1988 | Hirahara et al. | 346/76 |
| 4,814,891 | 3/1989 | Uchiyama et al. | 358/296 |
| 4,845,514 | 7/1989 | Mitsushima et al. | 346/76 |
| 4,884,080 | 11/1989 | Hirahara et al. | 346/46 |
| 4,890,121 | 12/1989 | Hirahara et al. | 346/76 |
| 4,899,170 | 2/1990 | Izumi | 346/76 |
| 4,910,603 | 3/1990 | Hirahara et al. | 358/298 |
| 4,967,283 | 10/1990 | Uchiyama et al. | 358/296 |
| 5,081,529 | 1/1992 | Collette | 358/80 |
| 5,099,259 | 3/1992 | Hirahara et al. | 346/76 |
| 5,126,757 | 6/1992 | Yamada | 346/76 |
| 5,175,635 | 12/1992 | Yamada et al. | 358/467 |
| 5,216,753 | 6/1993 | Ng | 395/109 |
| 5,309,526 | 5/1994 | Pappas et al. | 358/430 |
| 5,337,258 | 8/1994 | Dennis | 395/113 |

*Primary Examiner*—Arthur G. Evans
*Attorney, Agent, or Firm*—Westman, Champlin & Kelly, P.A.

[57] ABSTRACT

A printer providing time coded heating energy applications to printhead resistors to provide variable volmetric densities. Variable densities can also be provided through integrating dithering with the varying of volumetric densities. The printer can provide either one of two kinds of printing technologies by selection.

9 Claims, 28 Drawing Sheets

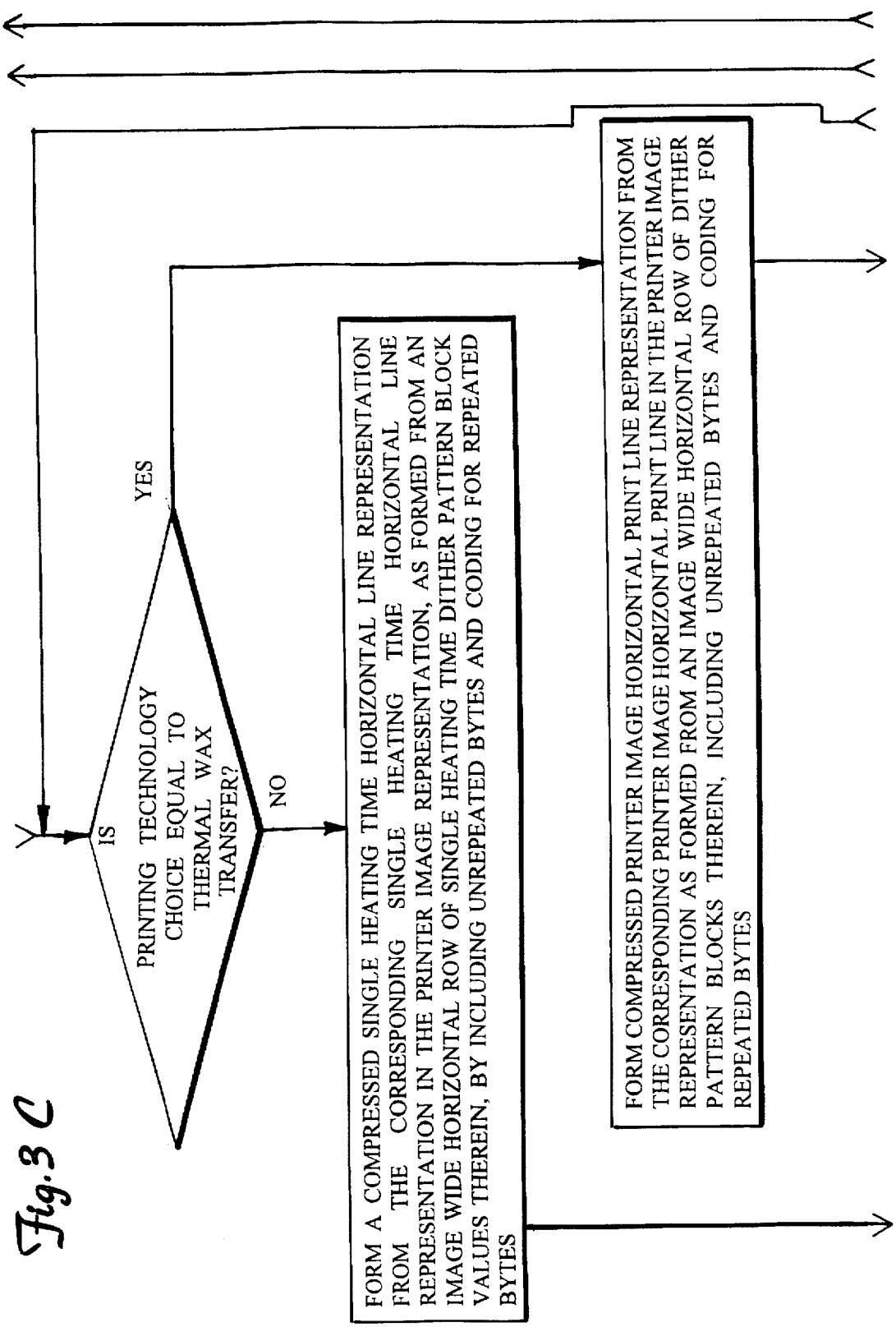

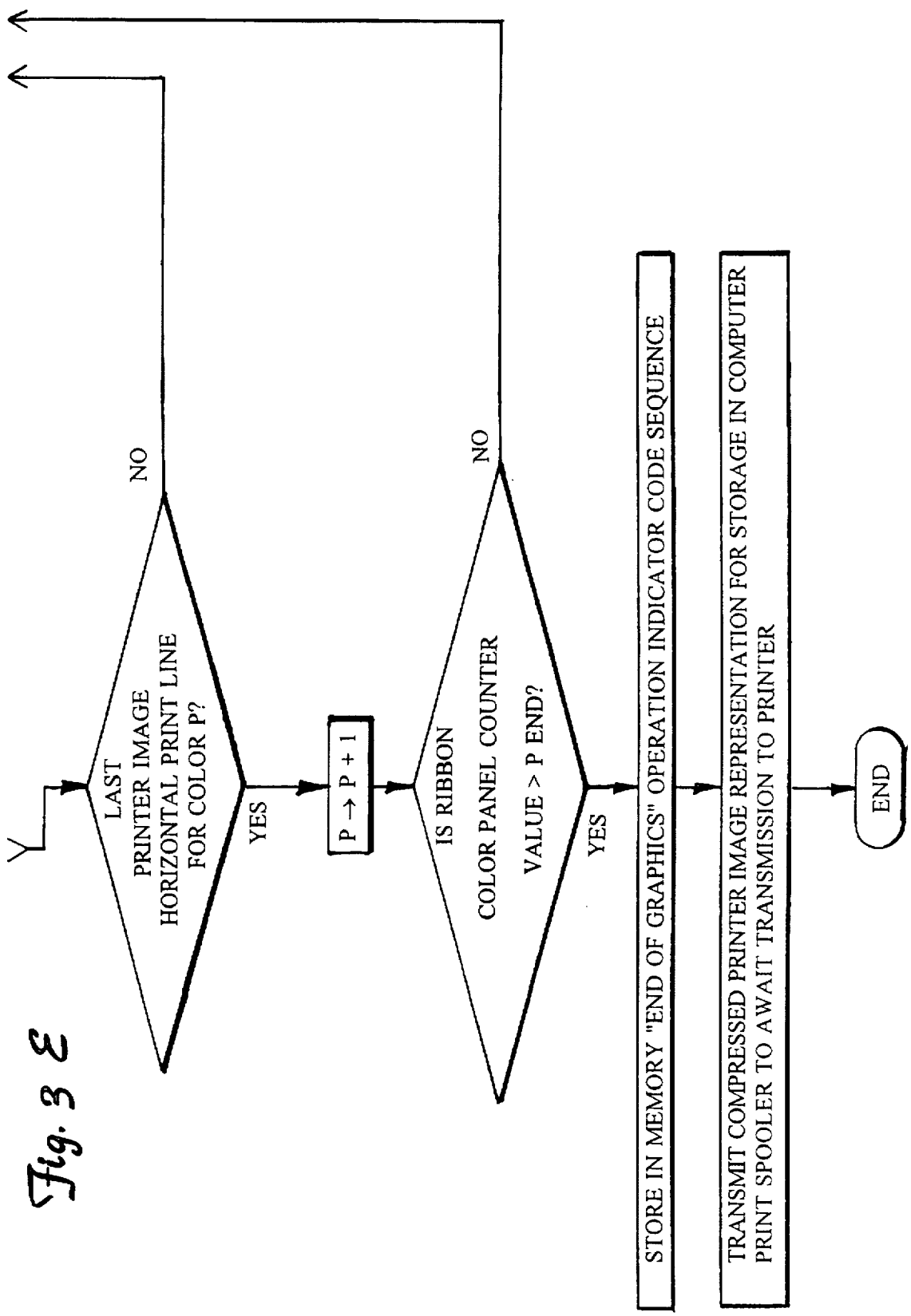

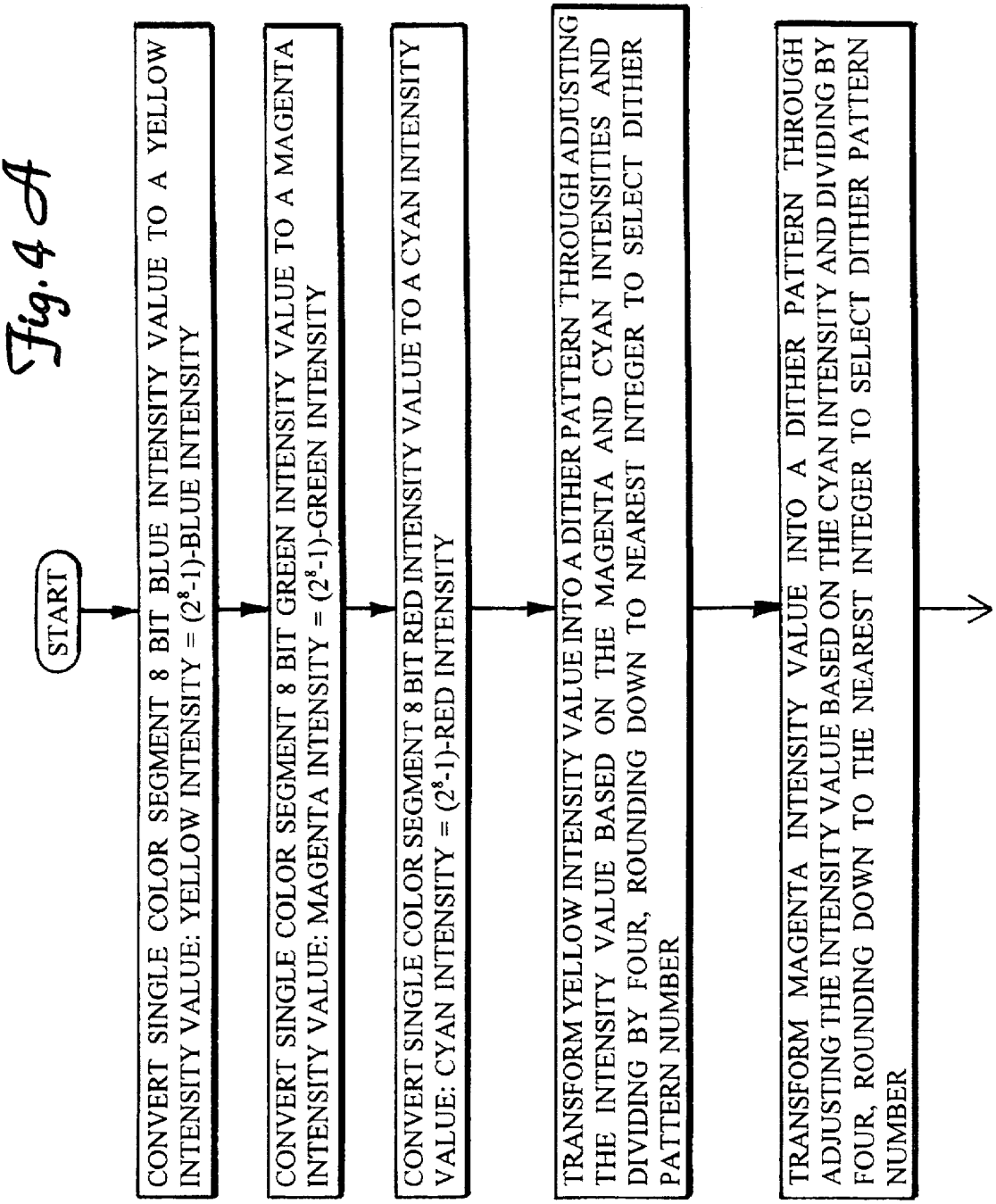

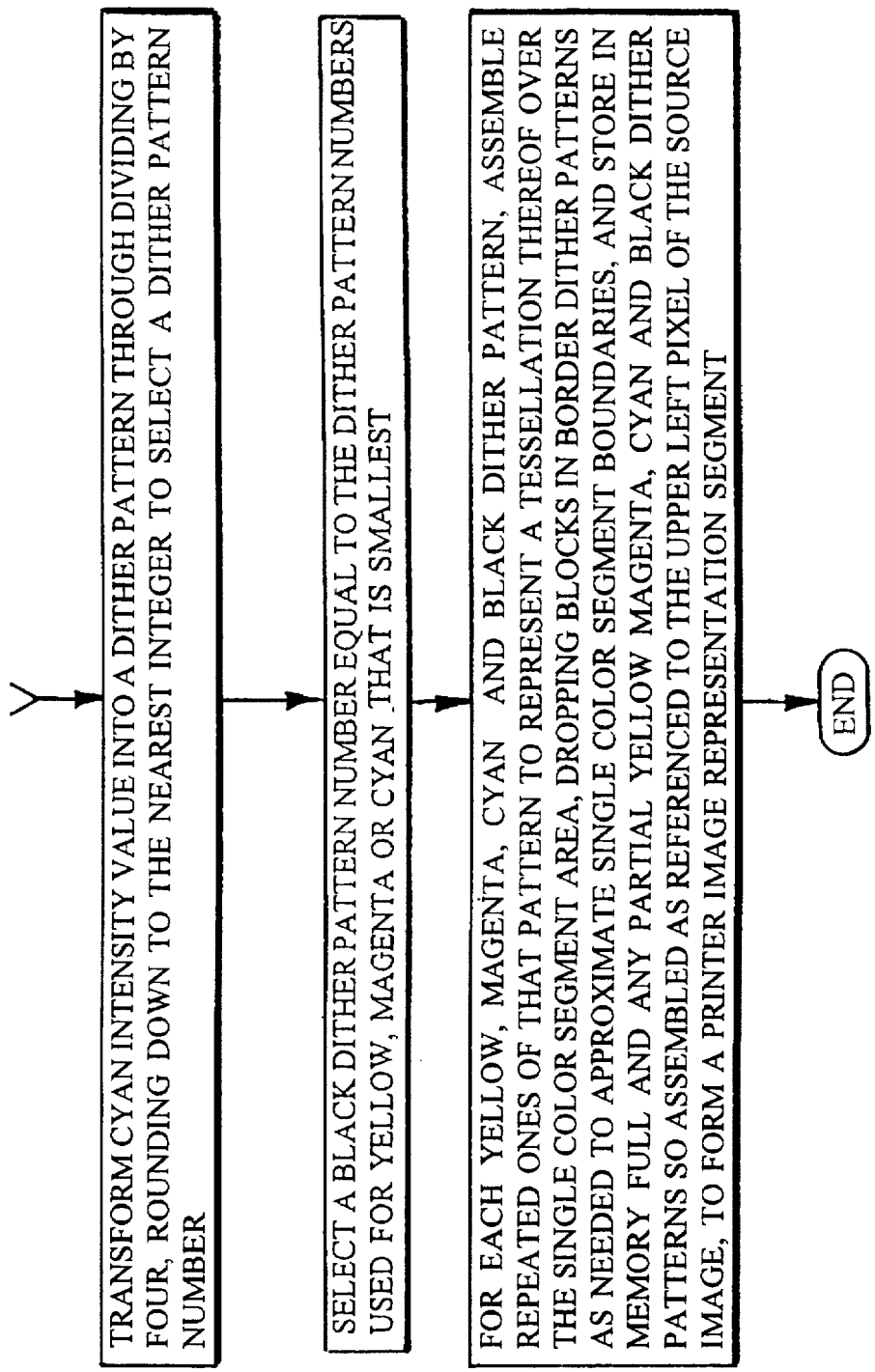

Fig. 5B

TRANSFORM CYAN INTENSITY VALUE INTO FOUR CYAN SINGLE HEATING TIME DITHER PATTERNS CORRESPONDING NOMINALLY TO FOUR BINARY CONSECUTIVE PLACE VALUE HEATING TIMES WITH EACH PATTERN BEING FOUR BLOCKS LONG AND WIDE

FOR EACH YELLOW, MAGENTA AND CYAN SINGLE HEATING TIME DITHER PATTERN, ASSEMBLE REPEATED ONES OF THAT PATTERN TO REPRESENT A TESSELLATION THEREOF OVER THE SINGLE COLOR SEGMENT AREA, DROPPING BLOCKS IN BORDER SINGLE HEATING TIME DITHER PATTERNS AS NEEDED TO APPROXIMATE SINGLE COLOR SEGMENT BOUNDARIES, AND STORE IN MEMORY FULL AND ANY PARTIAL YELLOW MAGENTA AND CYAN SINGLE HEATING TIME DITHER PATTERNS SO ASSEMBLED AS REFERENCED TO THE UPPER LEFT PIXEL OF THE SOURCE IMAGE, TO FORM A PRINTER IMAGE REPRESENTATION SEGMENT

END

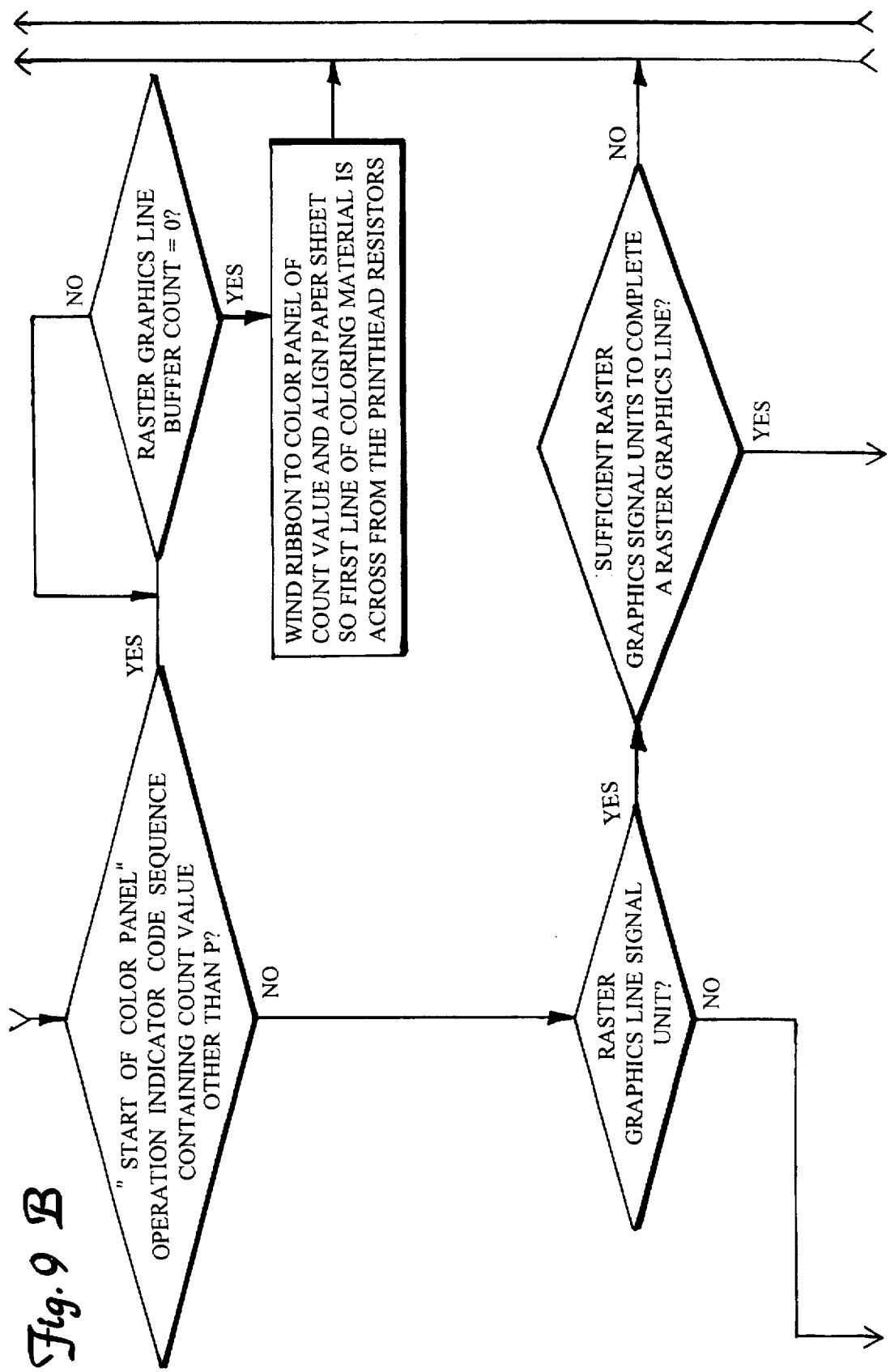

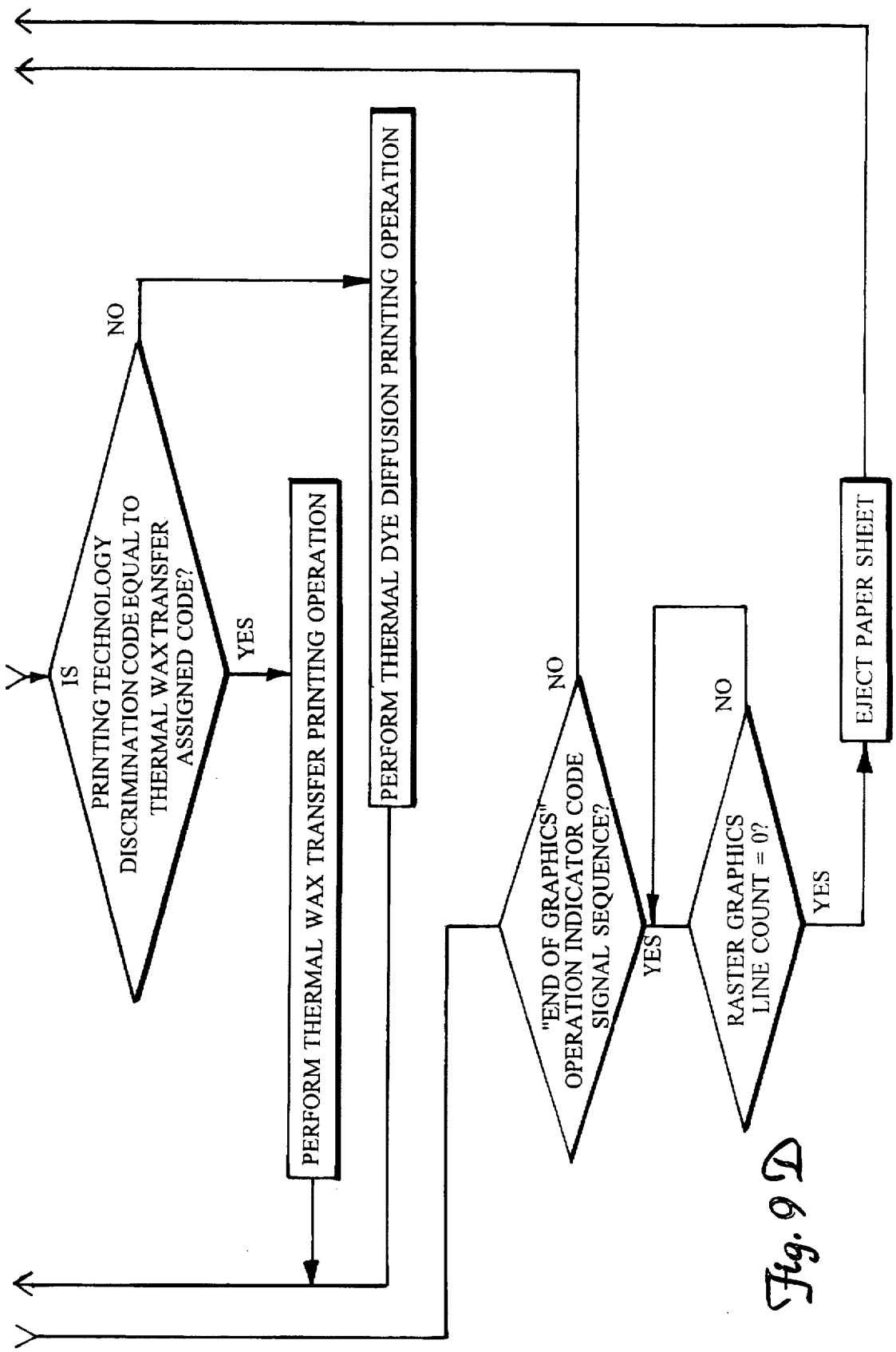

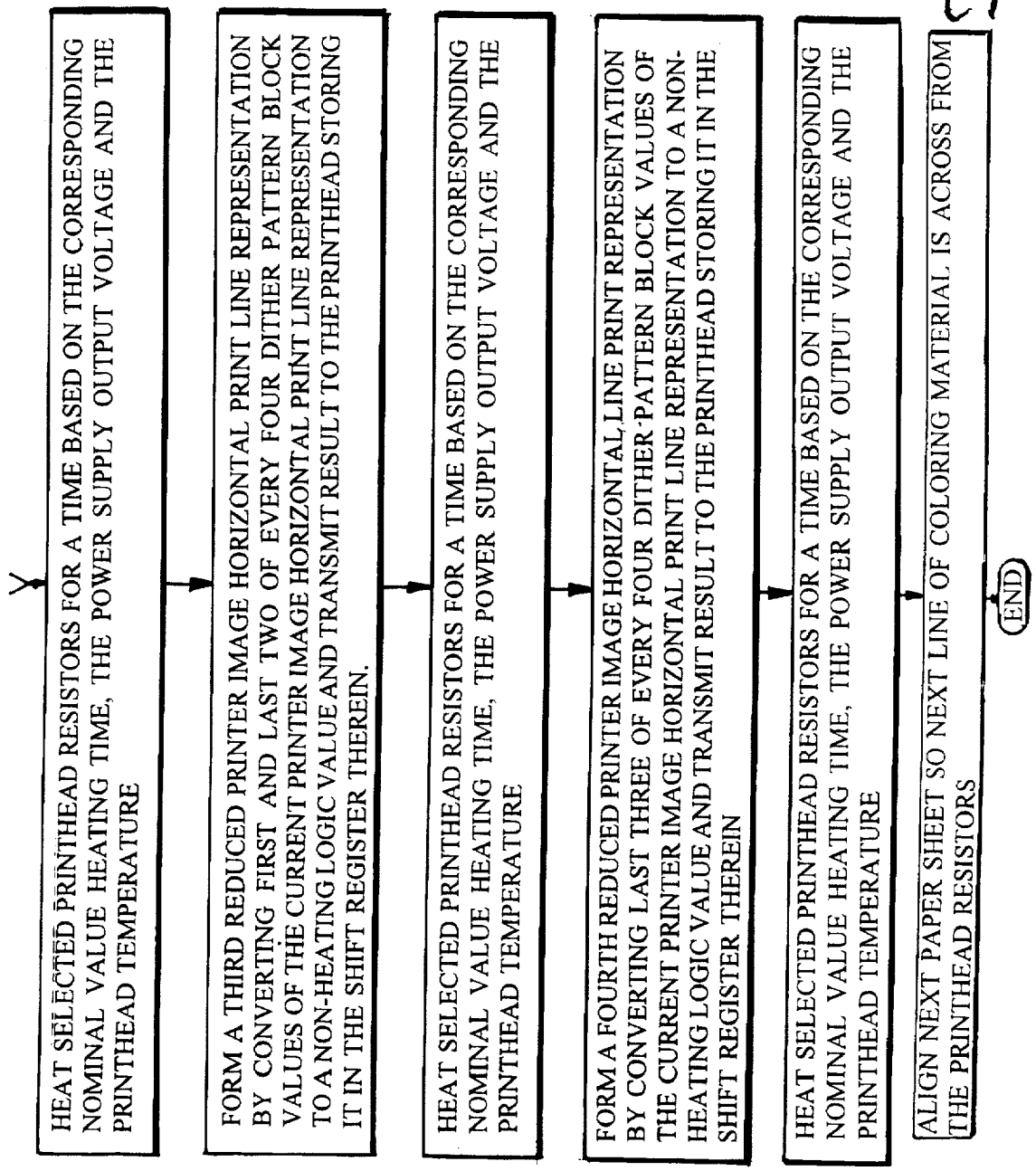

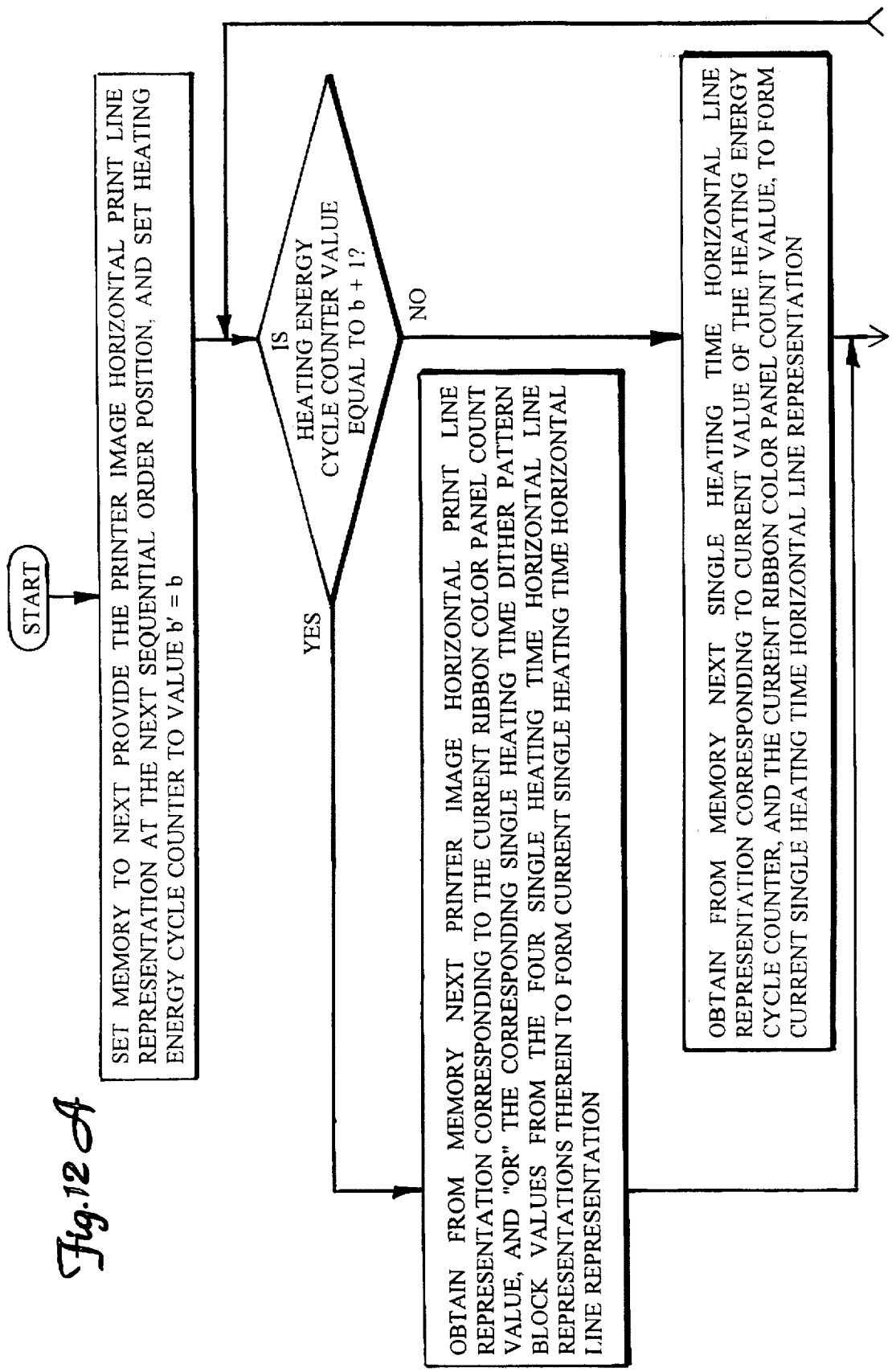

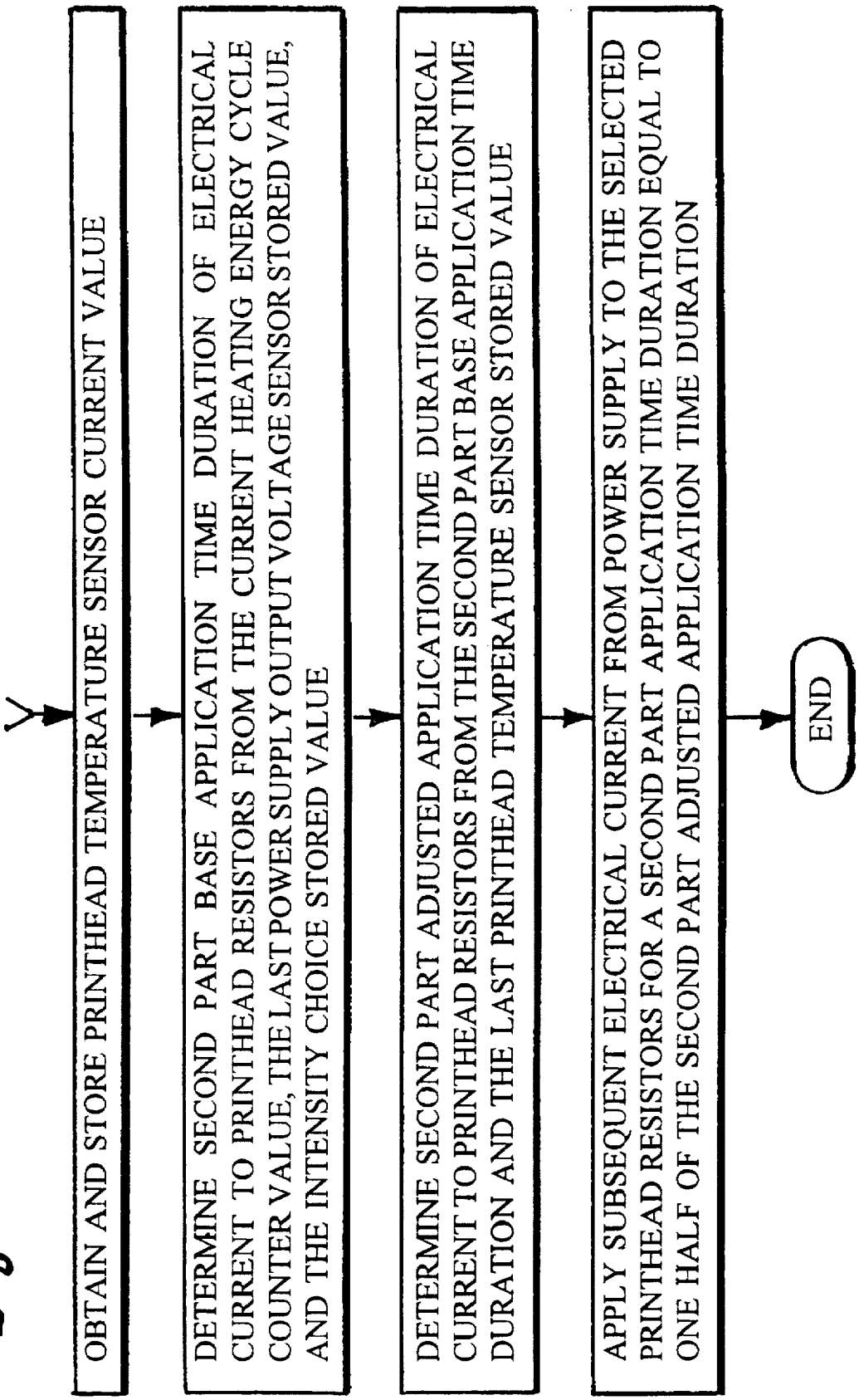

PATTERNED INTENSITIES PRINTER

This is a File Wrapper Continuation of application Ser. No. 08/065,816, filed May 21, 1993.

BACKGROUND OF THE INVENTION

The present invention relates to computer controlled printers and, more particularly, to such printers printing colored materials on the recording sheets to provide a color image.

The use of personal computers and, correspondingly, desk top printers controlled in part by such computers has increased very rapidly over the last several years. Many different printing technologies have been developed for these devices beyond that used in the impact printers initially performing in this role, including ink jet, thermal wax transfer and thermal diffusion, or dye sublimation, printing technologies.

These last technologies have been especially important in the growth of color printers, those having the capability of providing a colored image on a recording medium. The order of listing of these printing technologies above is typically the order of the quality of the results obtained in using them with ink jet technology generally providing the poorest quality of these technologies, and thermal diffusion giving the best. Unfortunately, the order of listing is also the order of cost with ink jet printers generally being cheapest and thermal diffusion printers being the costliest.

The desire for high quality in images recorded by such printers has led to those printers having often provided therein substantial computing capabilities in their own right to permit close control of electrical currents through the resistors in the thermal printhead which, in each supplying heat to the coloring material source to direct material therefrom onto the recording sheet, leads to each effectively providing a corresponding a color constituent of a pixel, on that sheet. In addition, extensive mechanical systems with expensive components such as high speed and high precision stepper motors, are usually used in such printers.

One possibility for reducing the cost of such printers is to have a significant fraction of the computing done by a computer controlling such a printer, as the capabilities of such computers have also grown substantially to permit such processing of printing data without too severely retarding the performance of the controlling computer in accomplishing its other purposes. However, the results of such computations in the controlling computer must be transmitted to the printer over the connecting cable which can take a relatively long time if the computer must be capable of transmitting for each printhead resistor any of all the possible intensities to be followed by that resistor, or any of all the possible patterns of intensities to be followed by groups of those resistors.

Another possibility to reduce cost is to always use the cheapest printing technology which will provide the needed quality in the resulting printed images. However, if quality needs differ from one printing task to another, purchase of sufficient different printers to provide the different printing technologies necessary will be expensive. Thus, there is a desire for less expensive color printers which do not lead to inordinately slow printing, or yield too poor a quality printing result, because of measures taken to reduce costs.

SUMMARY OF THE INVENTION

The present invention provides a printer for printing colored images on recording sheets through printing a succession of coloring materials thereon, and includes a thermal printhead with a plurality of electrical resistors and a register means with a plurality of registers each of which, in response to image definition signals, can be selectively switched between alternative logic states including a flow logic state. Such a register with a flow logic state occurring therein effectively selects a corresponding one of the electrical resistors to have a selected electrical current established therethrough during a concurrent enablement time period in which electrical currents are permitted to be simultaneously established in those printhead resistors having an associated register in a flow logic state. Several current enablement time periods can be established in succession with the durations of each substantially differing from those of the others, and different registers can be selected to have a flow logic state therein during such a period from those having same in another of such periods.

The occurrence of flow logic states in the registers is determined by printing signals based on image definition signals obtained from a colored image source. The printing signals can be generated in a part of the printing controller and then compressed, transmitted and decompressed in another part of the printing controller directly involved with the printer. The transmission can be over cable connecting the first part of the printing controller to the second part, and the first part of the printing controller can reside in the controlling computer.

Current enablement time periods chosen to have different durations in a succession thereof can be conveniently used with one kind of colored materials, and with different registers being selectable to have the flow logic state therein during such a period from those having that state in another of such periods. Current enablement time periods chosen to have substantially the same duration in a succession thereof can be conveniently used with another kind of colored materials, and again with different registers being selectable to have the flow logic state therein during such a period from those having that state in another of such periods.

DETAILED DESCRIPTION OF THE PREFERRED EMBODIMENTS

Figure 1:
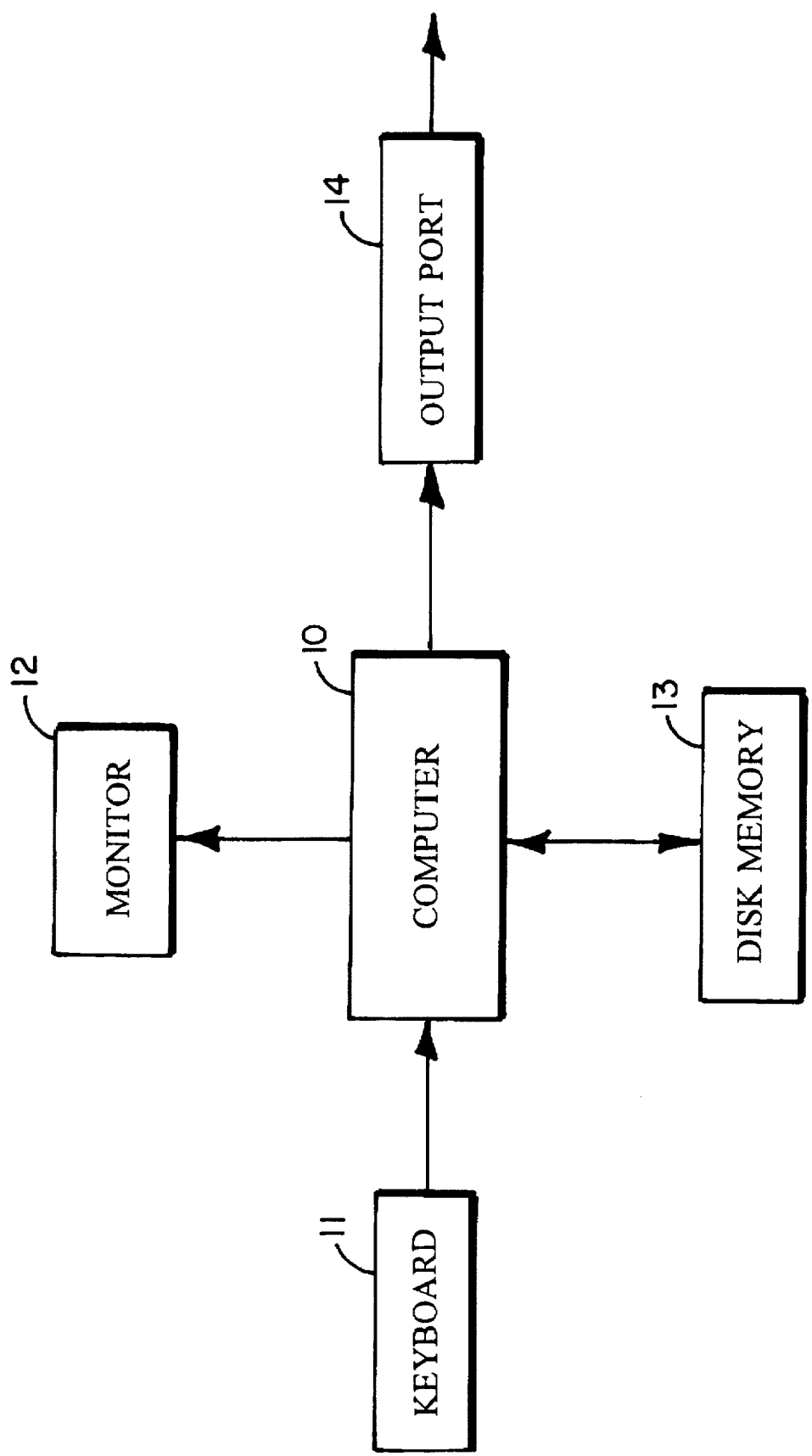
FIG. 1 shows a block diagram of a computing system.

FIG. 1 shows a block diagram of a typical personal computer arrangement having a computer, 10, with peripherals connected thereto, including a keyboard, 11, for providing information and directives to computer 10 from a user thereof. Further included in the peripherals are a monitor, 12, for communicating to the user actions and statuses of computer 10, and a disk memory, 13, for large and nonvolatile storage of information. Computer 10 has internal thereto an active memory which is volatile, and various other subassemblies and components necessary to satisfactory operation thereof. Included in computer 10 is a bus arrangement between the central processing unit therein and various electronic subassemblies for interacting with peripherals, including an output port electronic subassembly, 14. Output port electronic subassembly 14 is suitable for communication with a printing device under the control of computer 10.

Figure 2:
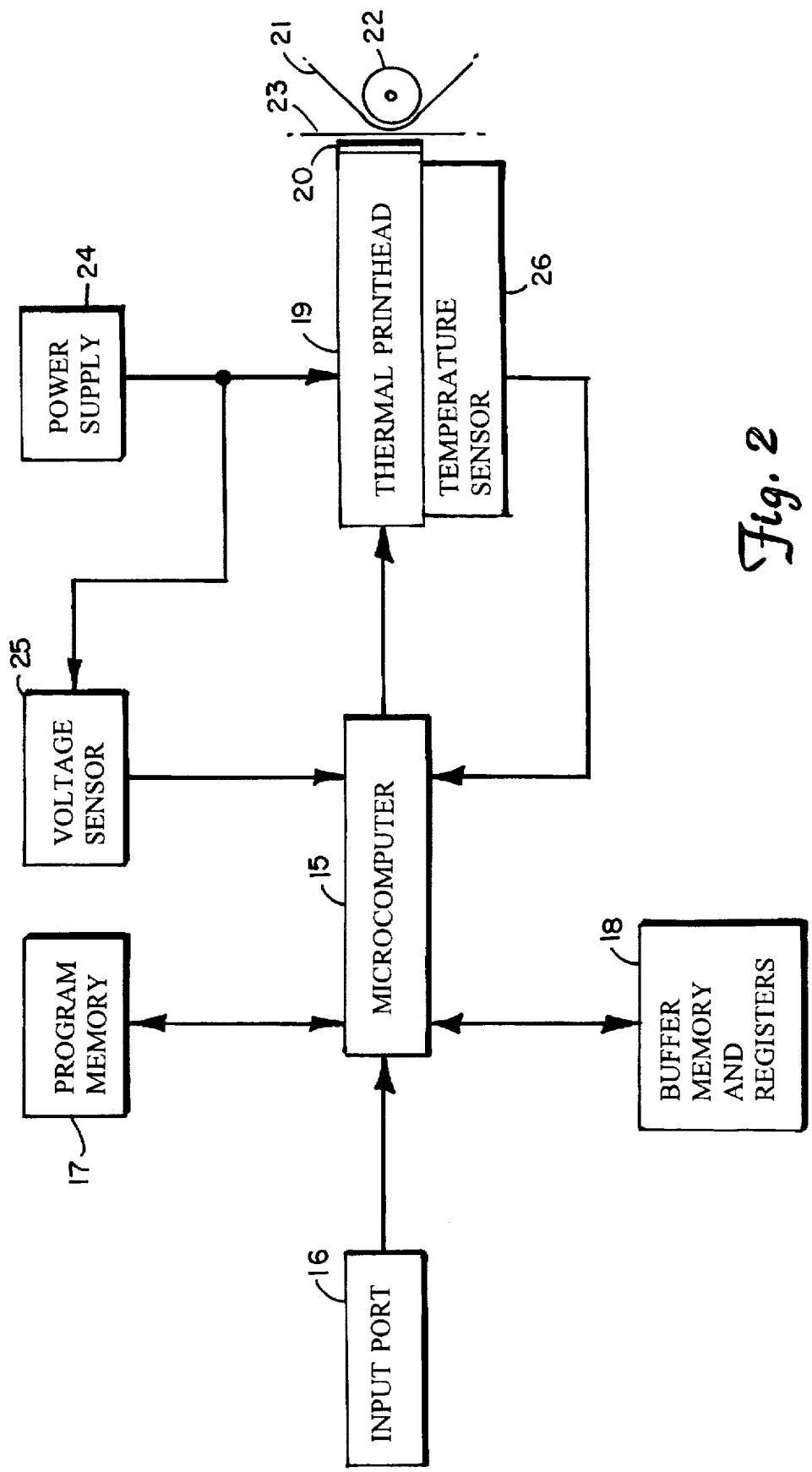
FIG. 2 shows a block diagram of a printing system.

A block diagram of such a printer is shown in FIG. 2. A microcomputer, 15, serves as a printing controller, or at least part of a printing controller in conjunction with computer 10, for the printer. An input port electronic subassembly, 16, is capable of receiving signals from output port subassembly 14 of computer 10, and communicates such signals along a bus to microcomputer 15. Microcomputer 15 has a nonvolatile program memory, 17, and a volatile active memory, 18, to provide both buffer memory and registers for the operation of microcomputer 15. Microcomputer 15 operates a thermal printhead, 19, having a plurality of electrical resistors, 20, electrically isolated both from one another and the substrate provided by the printhead, and arrayed along a line directed into the plane of the sheet on which FIG. 2 is provided. A typical number of such resistors is 1,728, and each represents the minimum pixel size provided in a printed image made on recording sheet by thermal printhead 19 through resistors 20. Such a recording sheet, 21, typically paper, is provided between a roller, 22, and the resistors 20 of thermal printhead 19, as is a coloring materials supply ribbon, 23, on the printhead side of sheet 21.

During printing, or coloring material deposition, an image line printing signal is shifted into a shift register provided in thermal printhead 19 having one register therein for each of resistors 20, and that register controls in part whether current flows in the register to which it corresponds. This printing signal is a digital signal in the form of a succession of two-state Boolean logic signal portions each of which sets the logic state in the register it last affects after the shifting is completed of that printing signal into the shift register prior to the next line to be printed in the image. A Boolean logic value of "1" in a register results in selecting the one of resistors 20 corresponding thereto to have current flow therethrough in the next current flow event permitting current flow in parallel through at least some of resistors 20, an event which is initiated and terminated by microcomputer 15. During such an event, thermal printhead 19 is pressed against coloring materials supply ribbon 23, pressing it in turn against recording sheet 21 which is thereby pressed against roller 22.

A mechanical ribbon transport system (not shown) winds coloring materials supply ribbon 23 past resistors 20 under direction of microcomputer 15 to provide a sequence of coloring materials panels of different primary subtractive colors as needed to form a multiple color printer image on recording sheet 21 in the multicolor printing, or deposition, process. A mechanical recording sheet transport system (not shown) loads a new sheet, typically paper, between ribbon 23 and roller 22 (part of the transport system). This transport system positions the leading edge of the sheet just past resistors 20 thereby determining the position of the first printing line in the image, and further forces this sheet past the resistors one printing line at a time (approximately the length of one resistor) under the direction of microcomputer 15 as needed during the printing process until the entire sheet has been printed in one primary subtractive color by depositing line-by-line coloring materials from a corresponding color panel in ribbon 23 by the selective heating of resistors 20. Thereafter, the transport system repositions the sheet by reversing its direction of movement until the first printing line is aligned again across from resistors 20, while at the same time the ribbon transport system positions a new color panel across from resistors 20, and the process is repeated to print another primary subtractive color line-by-line by depositing coloring materials from this next color panel onto and into the coloring materials earlier deposited from preceding color panels. Many different known mechanical transport systems can be used to transport sheet 21 back and forth past, and ribbon 23 forward past, resistors 20 of printhead 19 over roller 22 in synchronism with the printing process to be described below.

Resistors 20, typically film resistors that may be either the thin-film or thick-film kind provided on some sort of a ceramic base in printhead 19, are selectively heated, as indicated, by passing electrical current therethrough at selected magnitudes for selected times while pressed against ribbon 23. The coloring material transferred thereunder onto and into a corresponding area of recording sheet 21 as a result of the heat generated by this current flow represents the minimum size printer image pixel possible to be provided by the printing, or deposition, process. Such current is provided from a power supply, 24, which operates as a voltage source supplying current to resistors 20 effectively connected selectively in parallel between the output voltage terminals thereof. The voltage provided at these terminals is subject to variation as the supply is not a well regulated one to save costs, and so the value thereof is measured by a voltage sensor, 25, which provides an output signal to microcomputer 15 indicating the present value of the voltage being measured. In addition, the temperature of thermal printhead 19 will vary as the electrical energy imparted to resistors 20 varies through the selective application of currents of various magnitudes and durations to the resistors therein. As a result, the temperature of thermal printhead 19 is measured by a temperature sensor, 26, and an output signal therefrom concerning the current temperature value is provided to microcomputer 15.

The temperature of thermal printhead 19 must be taken into account in determining how much heating energy should be directed to be provided from resistors 20 to ribbon 23 due to the current supplied by power supply 24 to assure that a suitable amount of coloring material in ribbon 23 is provided to recording sheet 21 over an area thereof that is acceptably confined. If thermal printhead 19 is already at an elevated temperature, less heating energy is required from one of resistors 20 therein to provide the same volumetric density of coloring material on and into sheet 21 than is required with a cool printhead because of the heat energy already in that resistor that also thermally induces transfer of the material in ribbon 23 to sheet 21 in addition to that induced through the heating of that ribbon by a current passing of electrical current through the resistor.

The source image hard copy reproduction system formed by the combined systems of FIGS. 1 and 2 can be economically provided through using computer 10 in the computing system of FIG. 1 to perform many of the tasks necessary to provide printing control signals for the printing system of FIG. 2, thereby allowing use of reduced numbers of low cost components therein. Nevertheless, a relatively high quality of reproduction can be maintained in the colored images produced on recording sheet 21. In addition, the image hard copy reproduction system of FIGS. 1 and 2 can be selectively operated to further reduce costs by being able to select between different kinds of printing technologies provided therein. That is, the system will provide either thermal wax transfer printing technology results or thermal dye diffusion printing technology results on recorder sheet 21, at the choice of the user. Thus, if the quality of the colored image provided on sheet 21 need not be as high as can be provided by thermal dye diffusion in some situations, thermal wax transfer printing technology images can instead be provided on sheet 21 to thereby lower the cost.

The same mechanical transport systems for sheet 21 and ribbon 23 are used, and in the same machine structure, in the system of FIGS. 1 and 2 for providing either thermal wax transfer printing technology results or dye diffusion printing technology results on a sheet 21, and the same thermal printhead 19 is also used for these purposes with the same film resistors 20 thereon. However, a different kind of ribbon is used as ribbon 23 for each of the two kinds of printing technologies. A thermal dye diffusion ribbon with a series of color panels therein, typically yellow, magenta and cyan, is used to obtain dye diffusion printing technology results on sheet 21. A thermal wax transfer ribbon is used with a sequence of color panels therein, usually again yellow, magenta and cyan but also typically with the addition of black, to obtain thermal wax transfer printing technology results on a sheet 21. Ribbon changes are made convenient by placing the ribbons in a cassette so that just single, rigid objects need be interchanged to change ribbons without any need to handle a ribbon directly.

Thus, an appropriate ribbon type must be inserted into the mechanical ribbon transport system used in the printer system of FIG. 2 that corresponds to the choice of printing technology selected at keyboard 11, a selection that is taken as a basis for controlling the operation of computer 10 in the computing system of FIG. 1 to be in accord with the one or the other of the printing technologies chosen for the next image printing. Alternatively, the printing technology selection choice may instead be made in the computing system of FIG. 1 at monitor 12 providing a graphical user interface by using a "mouse" controller therewith.

Once made, the choice introduced in computer 10 sets a printing technology discrimination code that is stored in memory with either a value assigned to the thermal wax transfer printing technology or a value assigned to the thermal dye diffusion printing technology. The code value will be used in the software command sequence to properly direct operation of the computing system of FIG. 1 and of the printing system of FIG. 2.

The computing system of FIG. 1 operates under the command sequence set out in the software contained both in disk memory 13 in the computing system of FIG. 1 and in computer 10. In addition to the operating system for computer 10, and perhaps a graphics application software program also being used in computer 10, there will be a printer "driver" software program present in the computing system of FIG. 1 to properly prepare graphics data, containing a representation of an image (source image representation) to be reproduced on recorder sheet 21, to be represented in signals for transmission to the printing system of FIG. 2 to control pertinent operations thereof.

The source image representation will be formed into different kinds of signals depending on the printing technology chosen to be used in reproducing that image on recording sheet 21. Dye diffusion of coloring materials onto and into sheet 21 induced by thermal heating is effectively a continuous tone coloring system since the application of greater heat energy to ribbon 23 will result in a greater volumetric density of the dye in and on recording sheet 21. Thus, if 256 different intensity levels of a selected color on sheet 21 are desired, as is typical, then the printing system must be capable of providing 256 different volumetric densities of the dye diffused onto and into sheet 21 by providing 256 different heating energies for each of resistors 20 if direct control of every printer image minimum size pixel, each formed under a resistor 20, is to be provided. This done directly for each of resistors 20 would lead to very large data transfers being required between the computing system of FIG. 1 and the printing system of FIG. 2, and so is undesirable.

On the other hand, thermal wax transfer printing technology is a discontinuous tone coloring system that allows only for the presence or the absence of a colored wax for each possible minimum size pixel on sheet 21 formed under a resistor 20 as a result of either heating or not heating that resistor to transfer same, and increasing the heat energy supplied will not result in significantly greater volumetric density of coloring wax underneath the resistor (although it may lead to unwanted coloring wax occurring over a wider area than desired). Thus, obtaining 256 different intensities of a color on a recording sheet with thermal wax transfer printing technology requires use of dithering to provide coloring material areal density control with a dither pattern forming each printer image pixel that is 16 printhead resistor areas wide and 16 printhead resistor areas long to obtain that many different shades of a color. Since such a large dither pattern leads to unsatisfactory resolution in the resulting printer image, usually fewer levels of intensity are accepted for a color in a thermal wax transfer printing technology result, typically 64 levels, thereby allowing use of a dither pattern that is eight printhead resistor areas wide and eight resistor areas long as a pixel in that process as is done here.

The source image hard copy reproduction system of FIGS. 1 and 2 uses a combined dither pattern areal density control and coloring material volumetric density control in the thermal dye diffusion image printing results provided thereby to maintain acceptable pixel resolution and yet obtain a large number of different visual intensity levels for a color (well in excess of 64 levels though not a full 256 levels). In this system, a dither pattern four printhead resistor areas wide and four printhead resistor areas long is used to provide 16 different areal density patterns for a primary subtractive color giving a resulting 16 different visual intensities levels on recording sheet 21 for that color as printer image pixel constituent. In addition, each printhead resistor area, or block, in that dither pattern can be effectively provided with up to 16 different volumetric densities of coloring material in that block by requiring just five different heating energy application steps through effectively coding four of the different heating energies on a binary basis to thus allow combinations thereof to produce these up to sixteen different coloring material volumetric densities. Appropriate printing control signals for directing in part the printing system of FIG. 2 to provide such a range of areal densities and volumetric densities for the dye diffusion printing technology, and to provide such a range of areal densities for the thermal wax transfer printing technology, are generated in the computing system of FIG. 1 from the source image graphics files kept in memory under the operating system of computer 10 using that software and the printer "driver" software kept in disk memory 13.

Figure 3A:
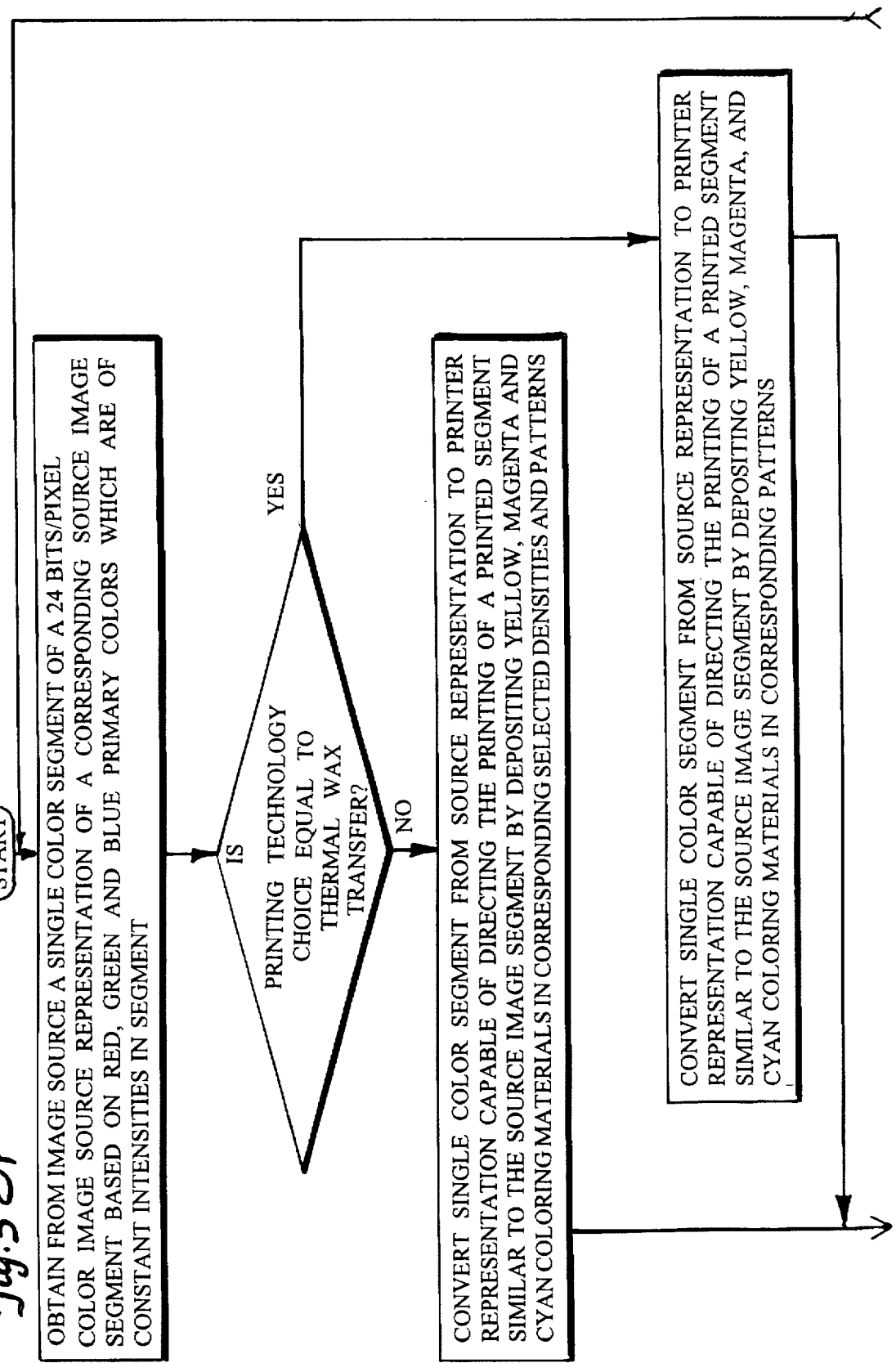
FIGS. 3A, 3B, 3C, 3D and 3E show a flow chart for a process in the system of FIG. 1, FIGS. 4A and 4B show a flow chart for a process in the system of FIG. 1, FIGS. 5A and 5B show a flow chart for a process in the system of FIG. 1, FIGS. 6A and 6B show a flow chart for a process in the system of FIG. 1.
Figure 3B:
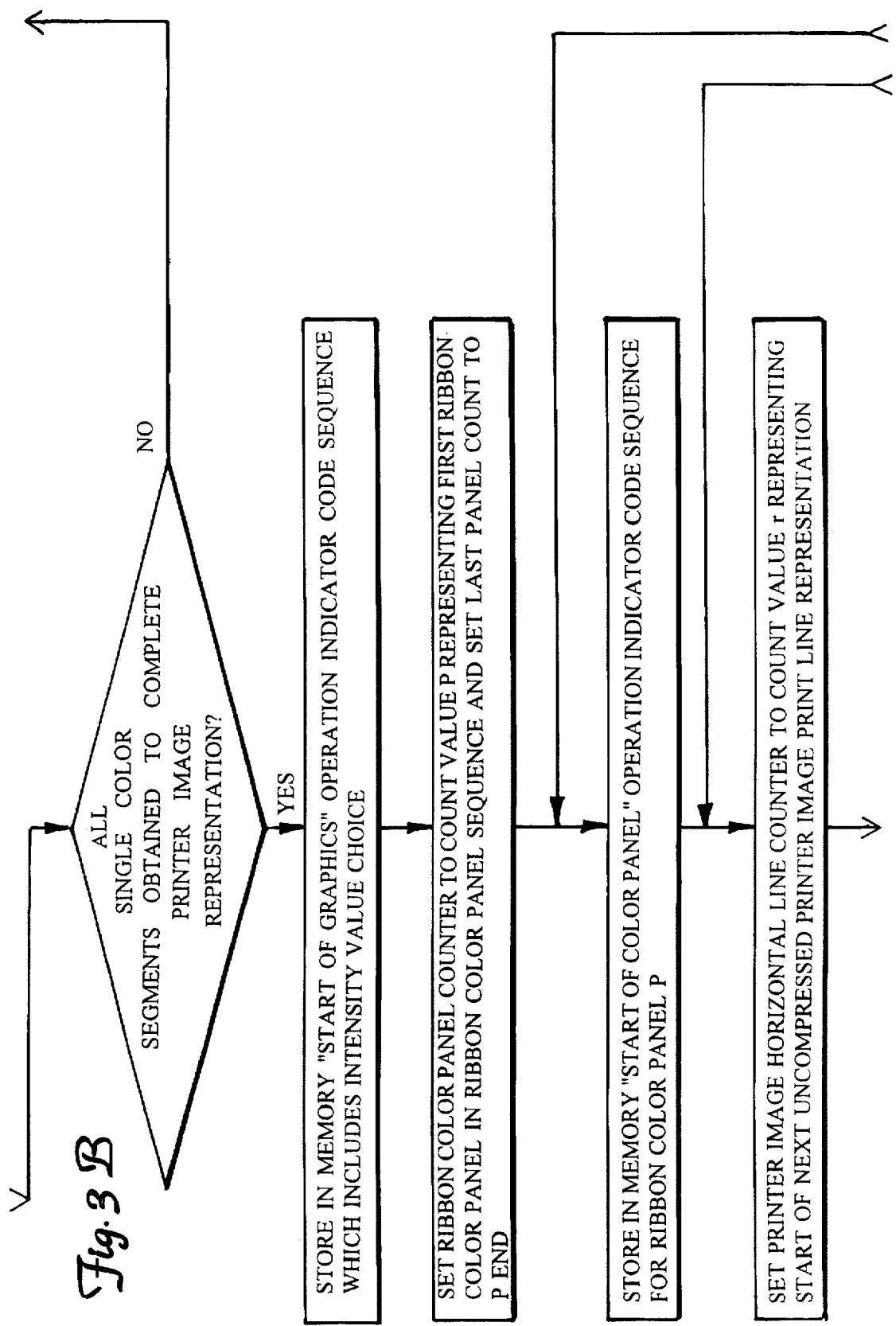
Figure 3:
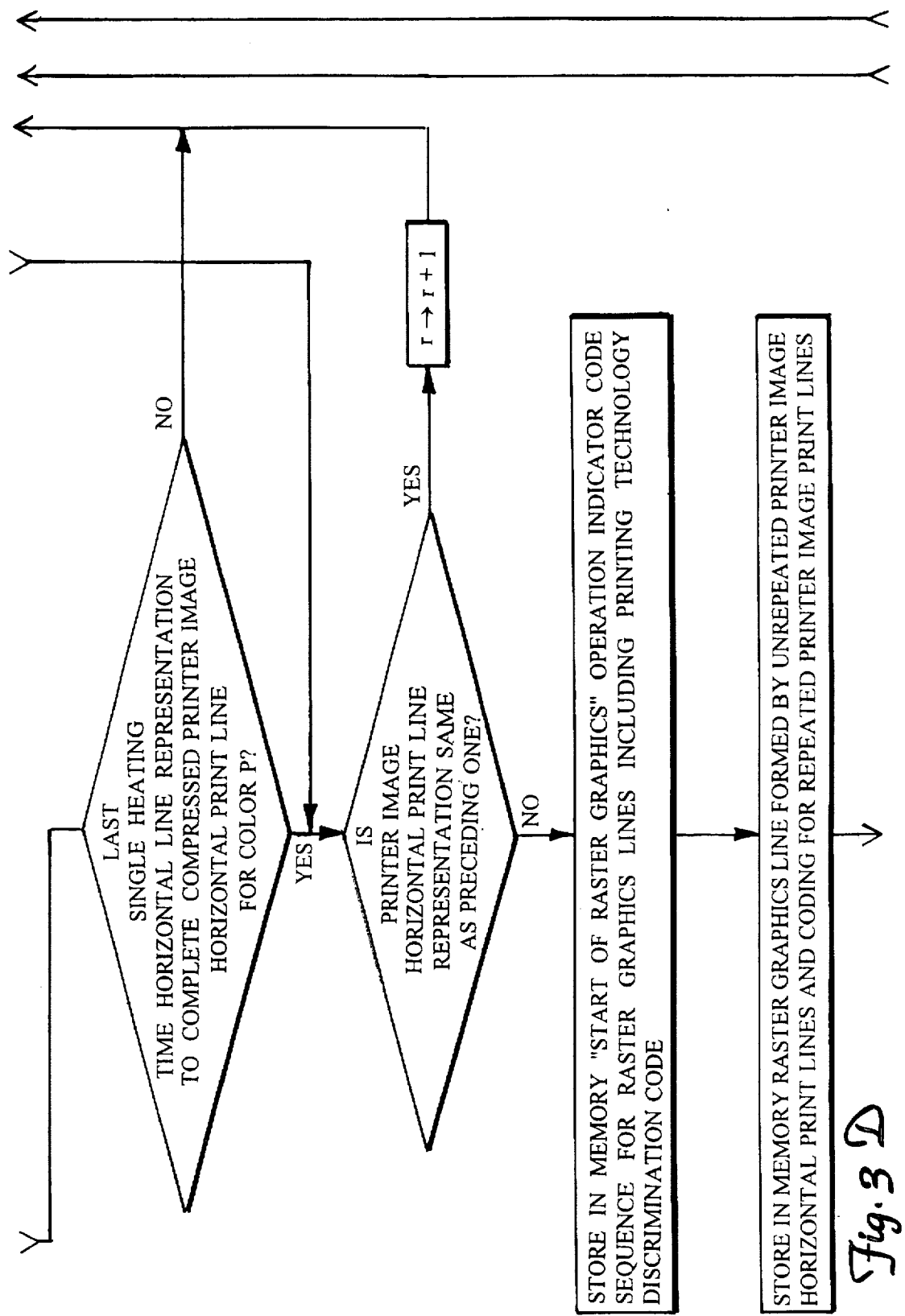

This generating of printing control signals in the computing system of FIG. 1 follows the steps set out in the flow chart of FIG. 3 extending over FIGS. 3A, 3B, 3C, 3D and 3E. The source representation of the source graphics image to be reproduced as a printer image on recording sheet 21 by the printing system of FIG. 2 may be generated in a graphics application software program being operated in computer 10 under its operating system, or obtained from an external source of graphics information imported into computer 10, or the like. The source image graphics information will be kept in graphics files in disk memory 13 of the computing system of FIG. 1, and these files will have the graphics information stored therein in one of a few well known different file formats commonly used for this purpose. Well known operating systems used in computer 10 will provide sequentially from such source image graphics files segments of the graphics image represented therein each having just a single color in it over the image area represented therein based on some combination of the red, green and blue primary additive color components used in representing and forming colored graphics images in computer 10. Such segments are be provided one after the other to the printer "driver" software as source image signals from computer 10, and form the basis on which printing control signals are prepared for operating any printing systems connected to that computer at output port 14 thereof corresponding to that printer "driver" software. The first block in FIG. 3A after the start balloon summarizes this segmenting and segment transfer process.

The printer "driver" software program then ascertains in computer 10 whether the selection of printing technology made as indicated above was for thermal wax transfer printing technology in the decision diamond following this first block in FIG. 3A. If so, the program begins converting a single color segment of the source image representation kept in the source image graphics files of computer 10, based on the color space formed by the additive primary colors of red, green and blue, to a corresponding printer image segment representation based on the primary subtractive colors of yellow, magenta and cyan for that space shown in the corresponding block following the decision diamond in FIG. 3A. This conversion results in a corresponding dither pattern, or repeated ones of that pattern, for each such primary subtractive color component present in the printer image segment, a pattern or patterns which correspond to that segment in extent and in the intensity of that color component in that segment through the number of pattern blocks occupied by indicators requiring a corresponding resistor 20 to be heated to transfer the correspondingly colored wax from ribbon 23 to sheet 21.

If, on the other hand, the printing technology choice is not the thermal wax transfer printing technology, the choice must be the dye diffusion printing technology, and a somewhat similar conversion occurs as indicated in the corresponding block following the decision diamond in FIG. 3A. Here, however, the conversion is to both dither patterns and different volumetric densities through a cumulation of dither patterns to represent the extent and intensity of the single color segment.

The conversion process to obtain a printer image segment representation for the thermal wax transfer printing technology choice situation in the corresponding block following the decision diamond in FIG. 3A follows the flow chart of FIG. 4 shown there extending from FIG. 4A through FIG. 4B. The conversion process starts by converting the intensity value of the primary additive color component blue, in the single color segment supplied by the operating system of computer 10, to the primary subtractive color component yellow in the color space. The possible 256 different intensity levels of blue in the source image representation are represented by an eight-bit code sequence, or a byte, and the binary representation for whatever value the blue intensity component has in the single color segment from source representation is subtracted from the maximum yellow intensity value of $2^8-1$ to provide the actual yellow intensity value in accord with the relationship between these two colors in the color space. This same kind of conversion step is repeated in sequence in converting the intensity in the same single color segment of the additive color component green, also represented by eight binary bits or a byte, to a corresponding eight-bit intensity value for the primary subtractive color magenta. Similarly, thereafter, the primary additive red color component in this single color segment is converted to a corresponding intensity value for the primary subtractive color component, cyan. These steps are completed in the first three blocks of the flow chart shown in FIG. 4A.

Since a printer image pixel is to be represented by an 8 block by 8 block dither pattern in which each block therein represents a possible location for a film heating resistor 20 on printhead 19 to add heat energy, only 64 different intensity levels could be provided for each of the primary subtractive color components to be printed by depositing a colored wax by thermal transfer from ribbon 23 to a recording sheet 21 as indicated above. Ribbon 23 will have a repeating sequence of panels of waxes in the primary subtractive colors plus, usually, black, which is added because deficiencies in the other colored waxes providing the primary subtractive colors leads to poor reproduction of black using them alone. Thus, reducing the 256 possible intensity values found for each of the primary subtractive colors of yellow, magenta and green in the preceding conversion steps to just the 64 intensity levels that can be represented in the thermal wax transfer printing process chosen to be used here requires those intensity values to be divided by four.

In addition, because of various deficiencies in the thermal wax transfer process, in ribbon 23, in recording sheet 21 and in the colored waxes themselves in serving as color filters when deposited on top of one another on recording sheet 21 in providing the primary subtractive colors, further adjustments to these intensity values are made to provide a balanced and visually pleasing printing result. Thus, the fourth block of the flow chart in FIG. 4A indicates that the yellow intensity value found is not only divided by four, but that such a division is made only after the intensity value for yellow has been adjusted in view of the intensity values found for magenta and cyan in a selected manner to yield the desired printing outcome. Similarly, the magenta intensity value is adjusted in view of the cyan intensity found, and then divided by four. The cyan intensity value is merely divided by four without further adjustment. The black effective intensity is found by setting its intensity equal to the intensity of that primary subtractive color component having the lowest intensity after the adjustments.

The intensity values found by these steps for the primary subtractive color components yellow, magenta and cyan, and for black if used, that are representing the color of the printer image single color segment are then rounded down to the nearest integer, and that integer value resulting for each is used to select a corresponding dither pattern therefor. The printing, or wax deposition, process following the selected dither pattern for such a color component will result in placing over the printer image pixel area defined by that pattern sufficient thermally transferred wax material of that color, i.e. provide a sufficient areal density of the corresponding colored wax material, to give the visual intensity approximately representing that found in the foregoing conversion process for that color.

Whether or not a resistor 20 corresponding to a block in a dither pattern has an electrical current passed therethrough during a thermal wax transfer deposition operation, which will result in a colored wax portion occurring adjacent such a resistor on ribbon 23 being deposited on corresponding portion of recording sheet 21 because of the resultant heating if such a current flows, is determined by the presence of a Boolean logic state "1" being in a corresponding register in the shift register present in printhead 19 as indicated above. The presence of a logic state "1" value in the corresponding register effectively selects that resistor to be energized by such an electrical current concurrently with the heating energy application period occurring in such a deposition step during which such currents flow in parallel through resistors 20 so selected in printhead 19. On the other hand, the presence of a "0" Boolean logic state in such registers effectively selects the corresponding resistors 20 to not have a current flow therethrough during that deposition operation. Thus, selecting a dither pattern corresponding to one of 64 intensity levels requires finding that one of the 64 possible dither patterns which has the number of logic state "1" values therein equal to the intensity level found for the corresponding color in the foregoing conversion process, a value which can occur anywhere in the intensity range of 0 to 63.

Hence, the dither patterns to be found for each of the color components is a binary dither pattern, i.e. a pattern having only the Boolean logic values of "1" or "0" present in the blocks therein. As an example, the zero intensity level binary dither pattern is as follows:

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

As further examples, the intensity level 1 binary dither pattern would be

| 1 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 | and the intensity level 2 pattern would be

| 1 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 | and, finally, the intensity level 29 dither pattern would be

| 1 | 1 | 0 | 0 | 1 | 1 | 0 | 0 |
|---|---|---|---|---|---|---|---|
| 1 | 1 | 0 | 0 | 1 | 1 | 0 | 0 |
| 0 | 0 | 1 | 1 | 0 | 0 | 1 | 1 |
| 0 | 0 | 1 | 1 | 0 | 0 | 1 | 0 |
| 1 | 1 | 0 | 0 | 1 | 1 | 0 | 0 |
| 1 | 1 | 0 | 0 | 1 | 1 | 0 | 0 |
| 0 | 0 | 1 | 1 | 0 | 0 | 1 | 1 |
| 0 | 0 | 1 | 0 | 0 | 0 | 1 | 0 |

Starting with the zero intensity binary dither pattern, a logic state value "1" is inserted in a block of the previous dither pattern to give the next dither pattern in the order indicated in the following grid:

| 1  | 17 | 49 | 33 | 3  | 19 | 51 | 35 |
|----|----|----|----|----|----|----|----|
| 9  | 25 | 57 | 41 | 11 | 27 | 59 | 43 |
| 53 | 37 | 5  | 21 | 55 | 39 | 7  | 23 |
| 61 | 45 | 13 | 29 | 63 | 47 | 15 | 31 |
| 4  | 20 | 52 | 36 | 2  | 18 | 50 | 34 |
| 12 | 28 | 60 | 44 | 10 | 26 | 58 | 42 |
| 56 | 40 | 8  | 24 | 54 | 38 | 6  | 22 |
| 63 | 48 | 16 | 32 | 62 | 46 | 14 | 30 |

This pattern generation procedure yields a "randomized" set of 64 dither patterns. Since only 64 different patterns are used, only 63 fill-ins are shown as the zero intensity level pattern is one of the possible binary dither patterns.

Thus, with the assignment of a corresponding binary dither pattern to each of the three primary subtractive colors, yellow, magenta and cyan, and to the black color, the last two blocks in the flow chart portion in FIG. 4A and the first two blocks in the continuing flow chart in FIG. 4B are completed. A tessellation of these dither patterns over the single color segment for each color thus provides four different color component representations for that segment, and when the corresponding colored waxes are deposited in the order yellow, magenta, cyan and black on recording sheet 21 over one another in the area covered by the single color segment following the tessellated patterns, the original color will be approximately reproduced visually to an observer. Those blocks in a dither pattern which fall outside of the single color segment are "clipped" or dropped from the computer memory in which the dither pattern representations for each of the colors are stored in assembling the succession of single color segments to form a printer image representation from the original source image representation of a graphical image. Thus, the four tessellations of the single color segment corresponding to the three primary subtractive colors of yellow, magenta and cyan, and the black tessellation thereof, together form a printer image segment representation of that original single color segment. This completes the last block in the flow chart shown in FIG. 4B.

Figure 5A:
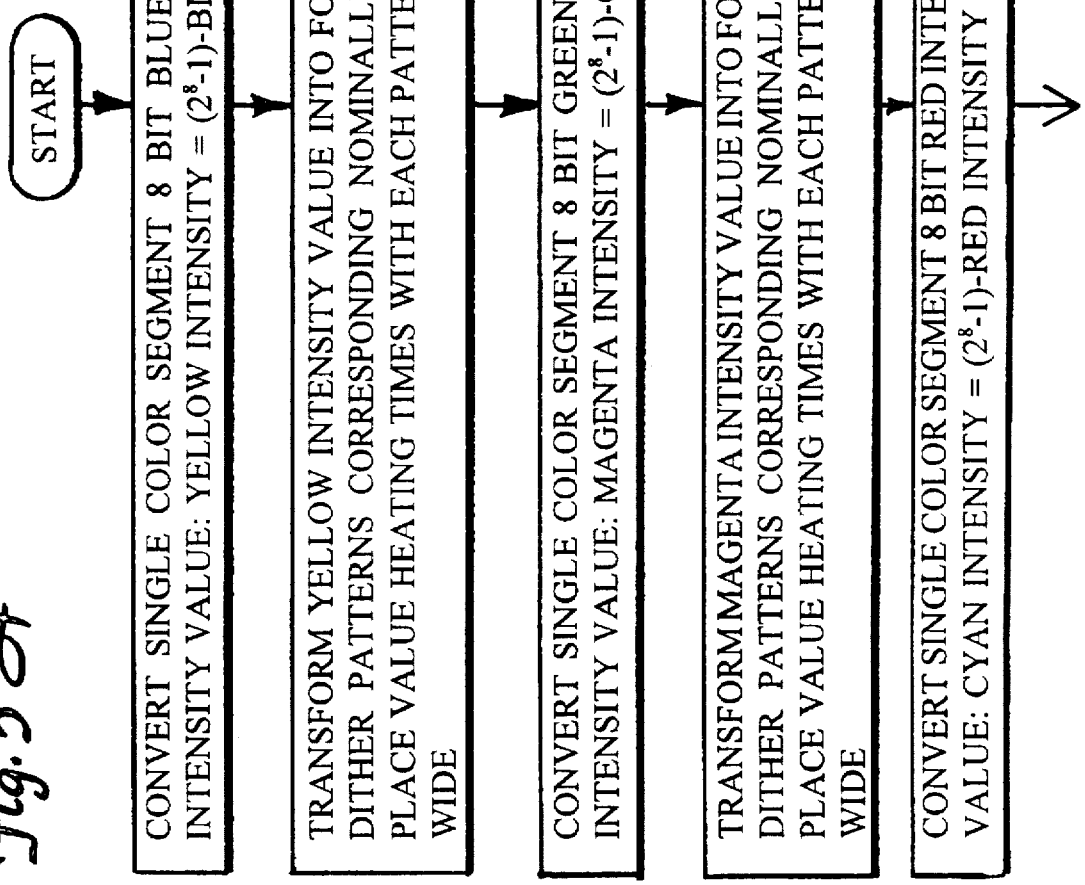
Figure 6A:
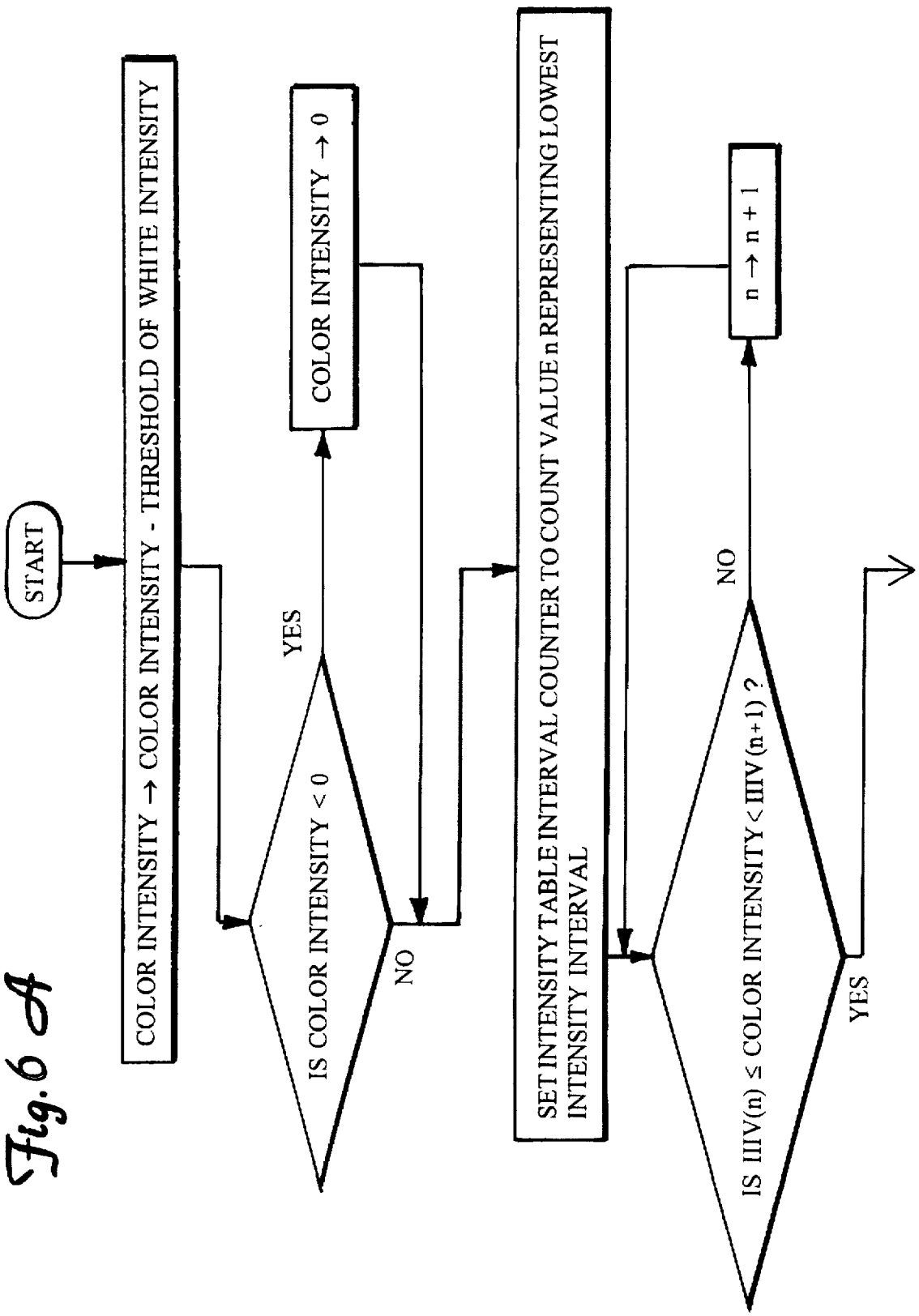

The thermal dye diffusion printing technology also converts the same kind of single color segment from a source image representation to a printer image representation, but does so through finding both corresponding volumetric densities of the coloring material to be transferred from corresponding color panel of ribbon 23 onto a recording sheet 21 as well as finding corresponding areal densities of the coloring materials through also finding corresponding dither patterns. These choices are integrated by having the intensity values in the conversion process above for the primary subtractive color components each used to effectively choose a corresponding composite intensity level decimal dither pattern for each color component that can be effectively decomposed into a series of binary dither patterns each used with a corresponding thermal dye diffusion deposition operation for the corresponding coloring material that has a succession of heating energy application events of differing durations such that succeeding events, other than a threshold event, after an initial event are approximately twice as long as their immediate predecessor. Although there are sixteen different dither patterns available, and there are seemingly sixteen different volumetric densities available so that two hundred fifty six different intensities (16×16) seem possible, heat dissipation effects during the succession of heating energy application events can constrain the possible usable different dither patterns to being fewer than sixteen. The conversion of the source image representation to a printer image representation for this printing technology in the corresponding block below the decision diamond of FIG. 3A follows the flow charts set out in FIGS. 5 and 6 with the main one of these flow charts beginning in FIG. 5A and extending through FIG. 5B.

As in the manner before, the operating system of computer 10 provides a single color segment of the source image representation therein to the printer "driver" software in the form of eight-bit intensity values for the three primary additive color components of red, green and blue combined in that segment to form that color. The eight-bit blue intensity value is then converted in the first block of FIG. 5A to the corresponding primary subtractive color intensity value, that is, an eight-bit yellow intensity value representation. That resulting yellow intensity value is then transformed in the second block of FIG. 5A into four yellow single heating time dither patterns each four blocks long and four blocks wide where a block corresponds to the area for which a resistor 20 can be heated to thermally transfer the dye from ribbon 23 to diffuse into recording sheet 21. This transformation process is set out in the flow chart beginning in FIG. 6A and extending through FIG. 6B.

The yellow intensity value is first converted to a new effective yellow intensity value by subtracting a recording sheet background variation threshold value therefrom. That is, the yellow intensity value is given effect only if it exceeds a certain threshold, and is otherwise considered to be zero intensity because any smaller intensity values give unpredictable printing outcomes among the variations of sheet color occurring in a nominally white recording sheet. This threshold imposition avoids unnecessary attempts to deposit yellow coloring materials which will have no or an uncertain effect, and which would unnecessarily entail adding heat to printhead 19 through resistors 20, a step which is to be avoided where possible to minimize elevations in the temperature of the printhead which can affect printing performance adversely if too extensive. Once the threshold value has been subtracted from the yellow intensity value to determine an effective yellow intensity, the decision diamond below the first block of FIG. 6A determines whether a negative intensity value has thereby occurred and, if so, assigns zero to the effective yellow intensity value in the block to the right thereof. Otherwise, the effective yellow intensity value passes through this decision diamond unchanged. The effective yellow intensity value is then passed on to the block which sets the intensity table interval counter to the minimum intensity interval n.

An initial intensity table is established for each of the primary subtractive color components, yellow, magenta and cyan, that relates the possible different intensities for that color component, due to different volumetric densities of corresponding dye coloring materials diffused onto and into recording sheet 21, to the different cumulative heating energies applied to corresponding coloring material panels in ribbon 23 that cause such different volumetric densities leading to those intensities. Avoiding (a) having to send up to 16 pulses from the computing system of FIG. 1 to the printing system of FIG. 2 for each resistor 20 to initiate a corresponding number of electrical current pulses therethrough to permit up to 16 different volumetric densities of coloring material dye resulting on an recording sheet 21, or avoiding (b) having to provide a decoding means and a pulsing circuit in the printing system of FIG. 2 by sending a number representing the number of electrical current pulses to be passed through each resistor 20 are desired to save cost and operation time. To that end, the present invention uses what is in effect a binary time coded sequence of heat energy applications, or electrical current pulses through resistors 20, to provide to each coloring material panel in ribbon 23 the cumulative heat energy desired therefor in a thermal dye diffusion deposition process for that coloring material as deposited to result in a primary subtractive color component on sheet 21 exhibiting the correspondingly desired intensity.

Figure 7:
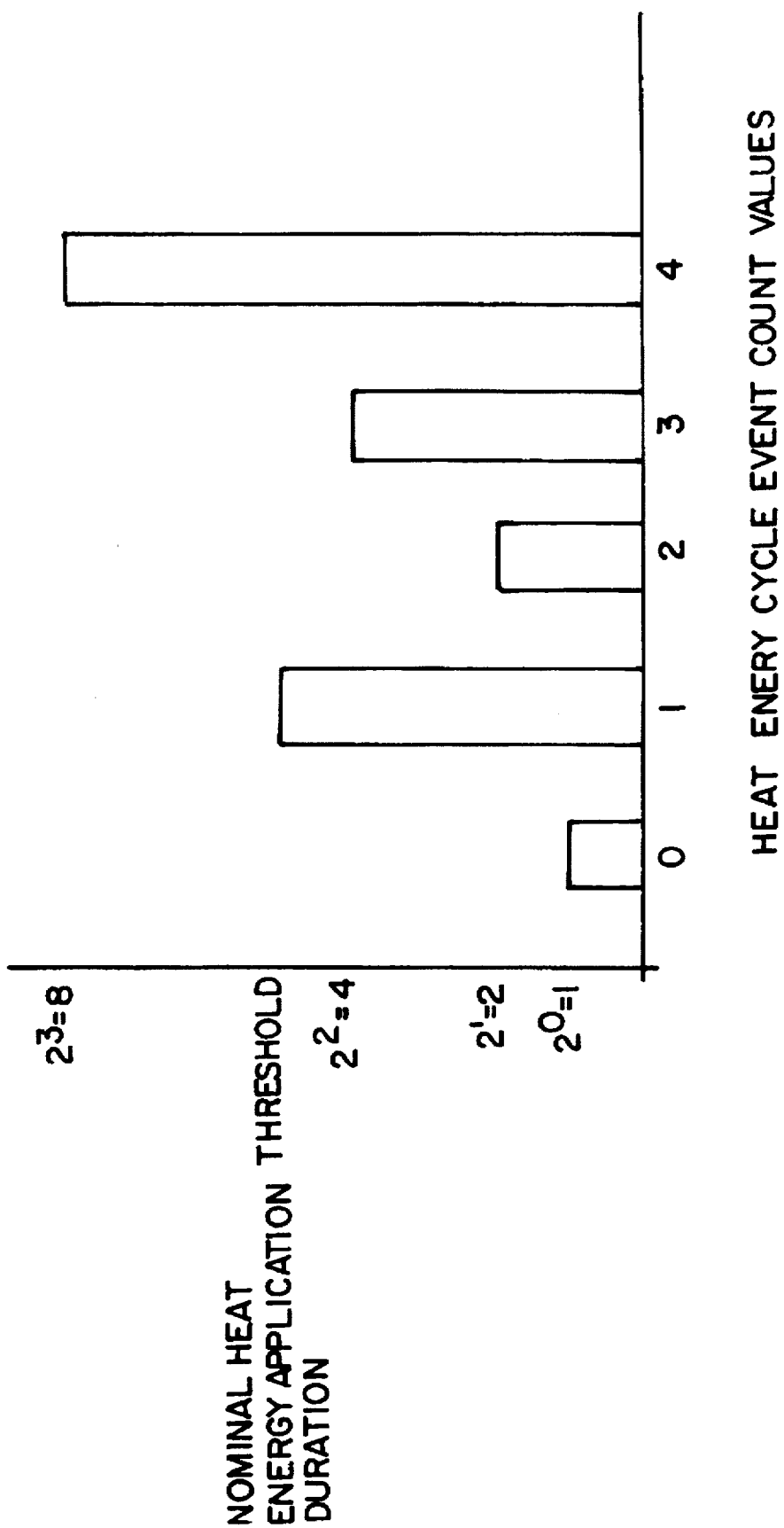
FIG. 7 shows a bar chart representing operations in the system of FIG. 2.

The binary time coding arrangement is indicated in FIG. 7 where a bar graph shows the durations of five different heating energy application events that are caused to occur in the printing system of FIG. 2 in depositing the dye coloring material on sheet 21 in each line thereon in which that material is deposited for each primary subtractive color. These application events are performed sequentially in the printing system of FIG. 2 in printing each line in each color in the order shown in FIG. 7 from left to right following the increasing count value assigned to each. The nominal heat energy application durations for four of the events, events designated 0, 2, 3 and 4, after the initial event each double in duration over that one preceding. These events are repeated for the next line of printing, or deposition, and for each line thereafter.

Thus, a binary number can represent the total accumulation of heating energy application time by a resistor 20 to a portion of ribbon 23 in depositing a coloring material in a line if provided through the cumulation of a series of substantially fixed, but different length, durations of heating energy applications. A binary number place holder value of one is included in the place values of the binary number representing a total cumulative heating energy application time if the corresponding substantially fixed heating energy application duration was included in accumulating that total time. A binary place holder value of zero is included in the binary number if the corresponding substantially fixed heating energy application duration was not included in accumulating that total time.

The inclusion of a substantially fixed heating energy application duration in the total accumulation of heating energy application time for depositing coloring material for a line means that an electrical current was supplied to the resistor 20 during the occurrence of the corresponding heating energy application event corresponding to that duration to result in depositing a corresponding amount of the coloring material for one primary subtractive color component by diffusing it onto and into recording sheet 21 at the position of that resistor. Hence, different four-place binary numbers can represent different total accumulation of heating energy application times, and so different volumetric densities of deposited coloring material for a primary subtractive color component, and thus also different visual intensities of that color component. As a result, a table can be provided relating the volumetric densities of the coloring materials for a primary subtractive color component to a binary number, and a corresponding table can similarly be provided relating approximately the resulting visual intensities from such volumetric densities of coloring materials to the same binary number.

In addition, the heating energy application cycle has a further application event therein involving providing a threshold heat application duration, designated with event count 1 in FIG. 7. The threshold event is performed in the same manner as the other events in the cycle for a resistor 20 by applying electrical current therethrough differing only in duration of doing so. This event is included in each cycle for each resistor 20 in each instance where there will also be any other heat energy application event occurring in that cycle for that resistor. This threshold heating is necessary since the characteristics of dye materials and ribbons are such that little diffusion, or unpredictable diffusion, of the dye will occur onto recording sheet 21 from the area of the ribbon adjacent a resistor 20 in the presence of heating from that resistor due to current through that resistor, if involved in some other heating energy application event, until after a threshold heating energy has been transferred to that portion of ribbon 23, and which must also be supplied by that resistor.

The threshold heating energy application event is provided to occur between the shortest two of the other heating energy application events in the heating energy cycle. These two shorter duration events, which may or may not be specified by a density requirement for a primary subtractive color component to be deposited, have the threshold event occur between them because, if used, the shortest duration application events will have the heat provided thereby dissipate relatively quickly compared to longer heat application events. This difference is reduced by providing the threshold heating application event adjacent to either of the shorter heating energy application events if used in a particular coloring material deposition in a line.

An intensity table for the three primary subtractive color components, yellow, magenta and cyan, found suitable for the printing system of FIG. 2 is as follows:

| DECIMAL EQUIVALENT DESIGNATED | INITIAL INTERVAL INTENSITY VALUES | | |
|---|---|---|---|
| INTERVALS | YELLOW | MAGENTA | CYAN |
| 0 | 0 | 0 | 0 |
| 1 | 14 | 13 | 13 |
| 2 | 24 | 23 | 22 |
| 3 | 44 | 42 | 40 |
| 4 | 77 | 73 | 69 |
| 5 | 91 | 86 | 82 |
| 6 | 122 | 116 | 110 |
| 7 | 132 | 125 | 119 |
| 8 | 173 | 164 | 156 |
| 9 | 180 | 171 | 162 |
| 10 | 192 | 182 | 173 |
| 11 | 196 | 186 | 176 |
| 12 | 226 | 214 | 203 |
| 13 | 230 | 218 | 207 |
| 14 | 237 | 225 | 213 |
| 15 | 240 | 228 | 216 |

The designations in this table on the left for each of the intervals into which the initial intensity values for each color on the right are divided are given as the decimal equivalents of the binary numbers actually involved. As an example of the correspondence represented in the tables, if the $11^{th}$ interval is considered in connection with applying yellow coloring materials diffused onto and into recording sheet 21, the resulting binary number involved is $1011=11_2$. From FIG. 7, this requires, in addition to the threshold heat application event, the heat application events numbered 0, 2 and 4 which is seen by the vertical axis, when added, to cumulatively provide heat energy application durations that result in a total accumulated heating energy application time of 11 units. Such a set of heating energy applications events applied to a resistor 20 in a heating energy cycle to apply yellow coloring materials would appear to result in an initial intensity interval value of 196 from the table in visually perceiving the result of diffusing the yellow dye coloring materials onto and into recording sheet 21 at the location across from this resistor in the printing system of FIG. 2.

Figure 8:
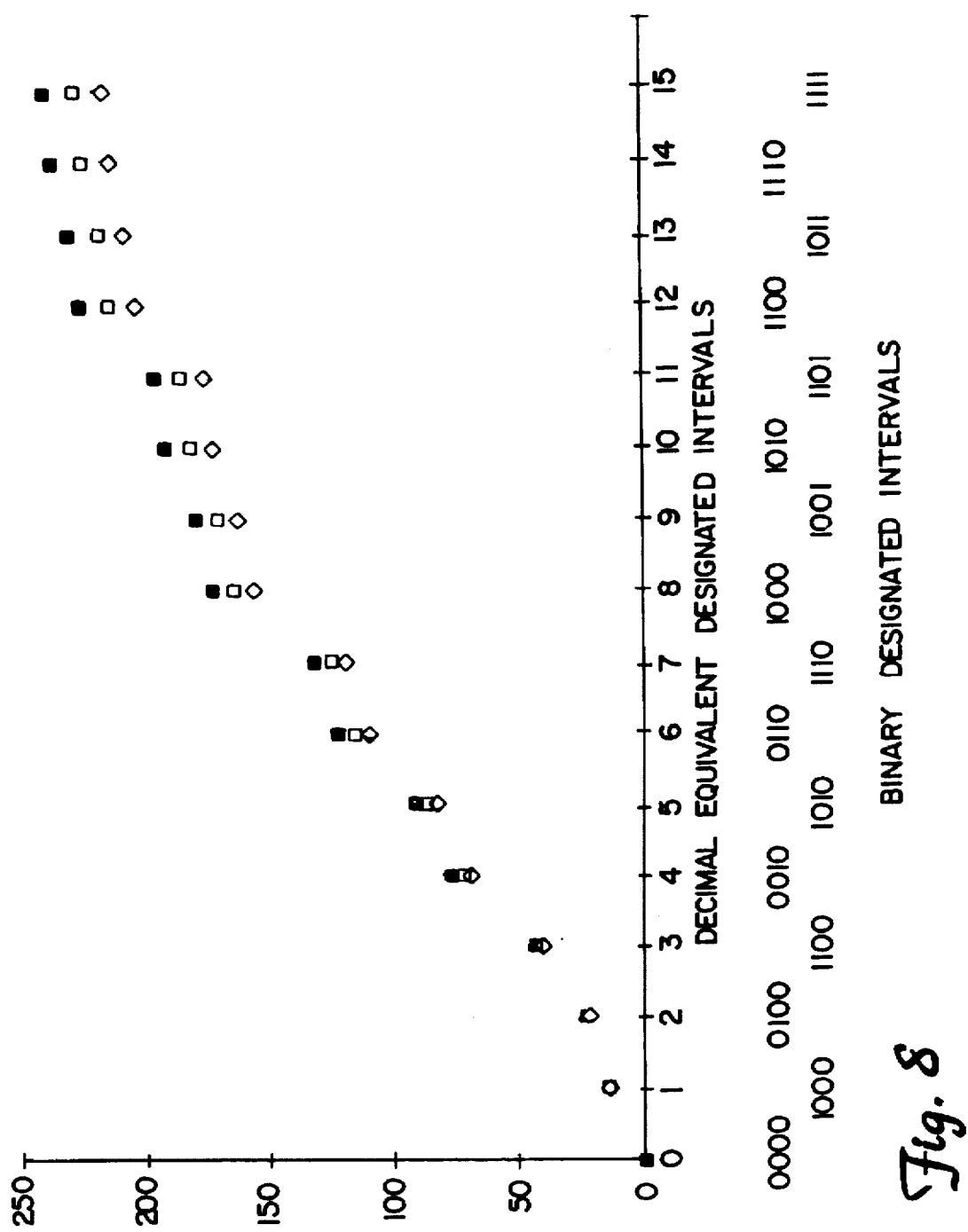
FIG. 8 shows a graph of tabular data used in the system of FIG. 1, FIGS. 9A, 9B, 9C, and 9D show a flow chart for a process in the system of FIG. 2, FIGS. 10A and 10B show a flow chart for a process in the system of FIG. 2, FIGS. 11A and 11B show a flow chart for a process in the system of FIG. 2, FIGS. 12A, 12B and 12C show a flow chart for a process in the system of FIG. 2, and FIGS. 13A and 13B show a flow chart for a process in the system of FIG. 2.

However, this table is an adjusted table rather than the initial table mentioned above, and it has not been constructed solely for the purpose of representing the various thermal transfer diffusion operations in the printing system of FIG. 2. Instead, they have been adjusted to take into account various deficiencies in the thermal dye diffusion process, ribbon 23, recording sheet 21 and in the diffusant coloring materials in serving as color filters when diffused atop one another onto and into recording sheet 21. In other words, these tables are used in the computing system of FIG. 1, not to represent the operation of the printing system of FIG. 2, but to direct the operation of that printing system so as to compensate for some of these deficiencies to thereby provide a balanced and visually pleasing printer image. FIG. 8 shows a plot of the tables above in which the upper data is for yellow, the middle data is for magenta, and the lower data is for cyan. One can quickly see that there is not a linear relationship between the evenly spaced intervals and the initial intensity interval values in each. Further, the values are different for the different primary subtractive color components. These characteristics of the plots in FIG. 8 are indicative of some of these compensation efforts.

In addition, the plots in FIG. 8 are also indicative of a difficulty which arises in using a sequence of heat energy application events of unequal duration in a fixed order application cycle for each primary subtractive color component. As can be seen in the plot of FIG. 8, in connection with the nonlinearity therein, some initial intensity interval values in an interval vary relatively little from those in the next interval, and some vary significantly from those in the next interval. To a substantial extent, this occurs because of the heat dissipation effects between subsequent heat energy application events. As can be seen reviewing FIG. 8, the effect is especially marked where the 1's place holder (furthest left) has one or more zeros in adjacent place holders between it and the next 1 value in the number. This is a reflection of the relatively quicker heat dissipation of the heat supplied during relatively short heat application durations as compared with the heat supplied in relatively longer heating energy application durations indicated above. Though there is some compensation to aid this situation, the relative different dissipations effect limits the number of different intensity levels which can be provided between the values shown in the graph of FIG. 8, which show 16 volumetric density differences, through the adding of areal density differences therebetween using dither patterns, as will be described below.

Thus, returning to FIG. 6A, the yellow intensity value is tested in the last decision diamond in that figure to determine in which initial intensity interval values it occurs between, or equals, in the initial intensity intervals for the primary subtractive color component yellow. By iterating through the table by using the last decision diamond in FIG. 6A and the counter-incrementing block to the right thereof until the correct initial intensity interval values are found, the interval designation number, or count value, n can be determined. Continuing into the first block in the flow chart continuation shown in FIG. 6B, a pattern number estimator can be found from this value n according to the formula set out there. That formula determines where in the interval between the interval designation n and the next higher interval designation the yellow intensity value occurs as a fraction of 16 intensity levels, and then forms a pattern number estimator by adding the fractional value to the value 16n representing a linear intensity value based on the interval designation value. The pattern number estimator obtained is then rounded down to the nearest integer to obtain a pattern number, as indicated in the second block in the flow chart portion shown in FIG. 6B. Finally, a further table is used to obtain four single heating time dither patterns corresponding to the four binary consecutive place value heating times indicated in FIG. 7 for the heat energy application events numbered 0, 2, 3 and 4.

A set of 256 "randomized" decimal dither patterns 4 blocks wide and 4 blocks long are kept in disk memory 13 of the computing system shown in FIG. 1. The zero intensity level decimal dither pattern

| 0 | 0 | 0 | 0 |
| 0 | 0 | 0 | 0 |
| 0 | 0 | 0 | 0 |
| 0 | 0 | 0 | 0 | is filled in with the decimal number 1 repeatedly, leaving the decimal number 0 where the numbers 1 have not been introduced, to find further patterns with a new one being provided with each additional number filled in. The filling in process continues until the pattern has been filled in the order

| 1  | 9  | 3  | 11 |
| 13 | 5  | 15 | 7  |
| 4  | 12 | 2  | 10 |
| 16 | 8  | 14 | 6  | to thus provide 17 different decimal dither patterns including the zero intensity decimal dither pattern. These 17 different decimal dither patterns can be numbered by the adding the values of all the decimal digits therein which results in the first 16 decimal dither patterns being numbered zero through 15, and this pattern number also gives the relative areal density of that pattern in indicating the number of blocks which are correspondingly to be filled in by heat transfer deposition operations under corresponding ones of resistors 20. Further, the numbers in the blocks indicate the volumetric densities which are to occur in those blocks if that pattern number is selected by cumulative heat transfer deposition operations.

As examples, the intensity level 1 decimal dither pattern is

| 1 | 0 | 0 | 0 |
| 0 | 0 | 0 | 0 |
| 0 | 0 | 0 | 0 |
| 0 | 0 | 0 | 0 | and intensity level 2 decimal dither pattern is

| 1 | 0 | 0 | 0 |
| 0 | 0 | 0 | 0 |
| 0 | 0 | 1 | 0 |
| 0 | 0 | 0 | 0 |

Once the decimal dither pattern with the 16 ones in the blocks therein is obtained in the filling-in process using decimal number 1 to provide the intensity level 16 decimal dither pattern, decimal number 2 is introduced to replace the decimal number 1 in forming further decimal dither patterns, the introduction of the decimal number 2 being made in the same order as given above for the introduction of decimal number 1. Thus, the intensity level 17 decimal dither pattern is

| 2 | 1 | 1 | 1 |
| 1 | 1 | 1 | 1 |
| 1 | 1 | 1 | 1 |
| 1 | 1 | 1 | 1 | and the intensity level 22 decimal dither pattern is

| 2 | 1 | 2 | 1 |
| 1 | 2 | 1 | 1 |
| 2 | 1 | 2 | 1 |
| 1 | 1 | 1 | 2 |

Once the decimal dither pattern is obtained having every block therein filled in with the decimal number 2 to thereby provide 33 different decimal dither patterns, the process is repeated again by starting to introduce the decimal number 3 in the same order as was the decimal number 1 introduced above. This process continues until 256 different decimal dither patterns are obtained which can be numbered zero through 255. The numbering of zero through 255 is found in each instance by adding up the total value of the decimal digits appearing in any decimal dither pattern whose number is sought. The intensity level 255 decimal dither pattern will have every block filled with the decimal number 16 except one which will have the decimal number 15 therein. As further examples, the intensity level 126 decimal dither pattern will be

| 8 | 8 | 8 | 8 |
| 8 | 8 | 7 | 8 |
| 8 | 8 | 8 | 8 |
| 7 | 8 | 8 | 8 | and the intensity level 149 decimal dither pattern will be

| 10 | 9  | 10 | 9 |
| 9  | 10 | 9  | 9 |
| 10 | 9  | 10 | 9 |
| 9  | 9  | 9  | 9 |

Figure 6B:
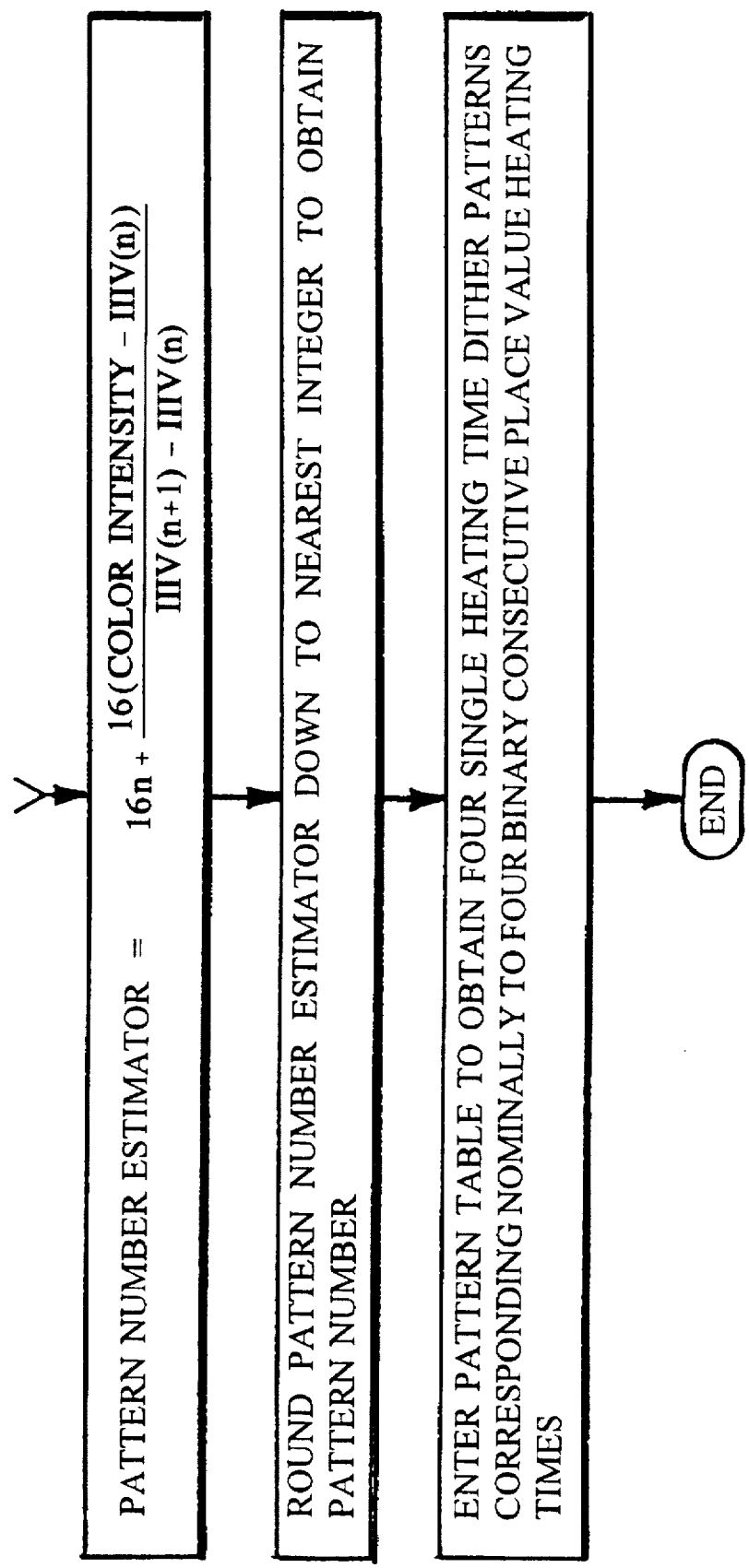

Thus, the pattern number found in the second block of the flow chart in FIG. 6B is used to pick the corresponding one of the dye diffusion printing technology decimal dither patterns through matching its intensity value based pattern number. As an example, assume that the single color segment obtained from the operating system of computer 10 has a color which is formed of the primary additive color components red, green and blue such that it can be reproduced by having a red color of intensity value 10, a green color of intensity value 20 and a blue color of intensity value 70. Hence, the corresponding yellow intensity value is obtained from the blue intensity value by converting it in the formula given above in the first block of FIG. 5A or 255−70=185. Removing the threshold value provided because of varying shadings occurring in various recording sheets taken to be the value 14, the effective yellow intensity value becomes 171. Consulting the table, the decimal equivalent interval designation is 7, i.e. n=7. The formula in the first block of FIG. 6B provides the value of 126.7. Rounding down as set out in the second block of FIG. 6B yields 126. The corresponding decimal dither pattern was set out above as an example.

Since in a decimal dither pattern no decimal numbers in the blocks therein exceed the decimal number 16, a decimal dither pattern can be decomposed into four binary dither patterns each representing one place holder level in the 16 four digit binary numbers that can be formed therefrom by combining the digits from each block in each of the 16 sets of four corresponding blocks occurring in these binary dither patterns. Thus, the binary digits in the binary dither pattern corresponding to the $2^0=1$ place value in the binary digit number all correspond to the heat energy application event designated 0 in FIG. 7. The next binary dither pattern corresponds to the $2^1=2$ place holder in the binary digit number, and correspond to the heat application energy event designated 2 in FIG. 7. Similarly, the two remaining binary dither patterns corresponding to place holder values $2^2=4$ and $2^3=8$ place holder in the binary number also correspond to the heat energy application events designated 3 and 4 in FIG. 7.

The block values of each of these single heating time dither patterns direct which of resistors 20 in printhead 19 will have current flowing therethrough in the heating energy application event associated with that binary dither pattern in having a Boolean logic value "1" present in blocks corresponding to resistors in which current is to flow, and in having a Boolean logic value "0" in blocks corresponding to resistors in which current is not to flow. Hence, digital signals representing these binary dither patterns form printing signals to control the deposition of dye coloring materials in the printing system of FIG. 2 as will be described below. Continuing the example given above, the intensity value 126 decimal dither pattern set out above can be decomposed into four binary dither patterns as indicated. These patterns, starting the lowest place holder value pattern and continuing with the further patterns arrayed in consecutive place holder value, are

| $2^0$ | | | |
|---|---|---|---|
| 0 | 0 | 0 | 0 |
| 0 | 0 | 1 | 0 |
| 0 | 0 | 0 | 0 |
| 1 | 0 | 0 | 0 |

| $2^1$ | | | |
|---|---|---|---|
| 0 | 0 | 0 | 0 |
| 0 | 0 | 1 | 0 |
| 0 | 0 | 0 | 0 |
| 1 | 0 | 0 | 0 |

| $2^2$ | | | |
|---|---|---|---|
| 0 | 0 | 0 | 0 |
| 0 | 0 | 1 | 0 |
| 0 | 0 | 0 | 0 |
| 1 | 0 | 0 | 0 |

| $2^3$ | | | |
|---|---|---|---|
| 1 | 1 | 1 | 1 |
| 1 | 1 | 0 | 1 |
| 1 | 1 | 1 | 1 |
| 0 | 1 | 1 | 1 |

Consider the decimal number 7 in the lower left-hand corner with the intensity value 126 decimal dither pattern. The same lower left-hand corner blocks in each of the corresponding binary dither patterns decomposed from this decimal dither pattern have the binary digits therein, starting with the binary dither pattern associated with the highest place holder value and working back up through the remaining binary dither patterns associated with consecutive decreasing place holder values, gives the binary number 0111 which has a decimal equivalent of seven. Similarly, for the decimal value eight in the upper left-hand corner of the intensity level 126 decimal dither pattern, the binary number derived from the four binary dither patterns decomposed from this decimal dither pattern yields for digits from the same upper left-hand corner blocks 1000 which is the binary equivalent of eight. Since the binary dither patterns are each associated also with a heating energy application event, the cumulative heat energy applied by resistor 20 to ribbon 23 through the four heat sequential heat energy application events (plus the threshold heat energy application event) will thus give a volumetric density of coloring dye materials diffused onto and into recording sheet 21 across from each resistor represented in the dither pattern block that is sufficient for the cumulative effect of all of the blocks in the pattern to give a perceived intensity approximating 126. Further, the way the decimal dither patterns are formed leads to there never being more than a single decimal number difference in a block in a pattern from those blocks adjacent thereto. As a result, artifacts of the dithering process are much reduced because of the smooth intensity changes in the resulting printer image.

Having completed the finding of four single heating time binary dither patterns corresponding to four binary consecutive place value heating times as described, the last block in the flow chart in FIG. 6B is completed. As a result, there is a transition from the second block in the flow chart of FIG. 5A to the third block in that flow chart where the process is repeated for the green primary additive color component in converting it to a magenta intensity. That magenta intensity is transformed in the fourth block of the flow chart into four magenta single heating time binary dither patterns again following the steps in the flow charts of FIG. 6. Finally, this process is repeated for the red primary additive color component in the single color segment by first converting it to a cyan intensity in the last block in the flow chart shown in FIG. 5A. The first block in that flow chart is continued in FIG. 5B and again results in four cyan single heating time binary dither patterns by following the steps set out in the flow chart of FIG. 6.

Thereafter, each single heating time binary dither pattern for each of the colors yellow, magenta and cyan must be repeated to provide a tessellation thereof over the single color segment. Again, blocks in the dither pattern are dropped from the memory in which the printer graphics files are assembled in the computing system of FIG. 1 to approximate the single color segment boundaries. The tessellated single heating time binary dither pattern results for each of the colors is then stored in that memory with reference to the upper left pixel of the source image to form a printer image representation segment. This completes the flow chart of FIG. 5 and both of the last two boxes in the flow chart of FIG. 3A. The first decision diamond in the continuation of the flow chart in FIG. 3B determines whether all of the single color segments in the source image representation have been converted to printer image segment representations and provided in the printer graphics file of the computing system of FIG. 1. If not, the printer image representation is completed by repeating the above process until all of the single color segments have been obtained and converted. If the printer image representation is completed, the process moves on in the first block in FIG. 3B to store in memory the "start of graphics" operation indicator code sequence which includes an intensity value choice made by the user to allow specifying relatively more intense or less intense colors in forming the printer image on recording sheet 21 as desired by the user.

Thereafter, the ribbon color panel counter is sent to count value P representing the first color panel in the ribbon color panel sequence which corresponds to the first color of corresponding coloring materials to be deposited on recording sheet 21 in the printing system of FIG. 2 when the printing process starts. There is then stored in memory a "start of color panel" operation indicator code sequence for ribbon color panel P.

At this point, compression of the printer image representation is undertaken to reduce the data that must be transmitted between the computer system of FIG. 1 and the printing system of FIG. 2 to reduce the cost or the time to be waited for a printed image to be provided on recording sheet 21, or both. The compression process merely reduces the amount of repeated data which would otherwise be sent. This data compression is started in the last block of the flow chart portion shown in FIG. 3B in which the printer image horizontal line counter is set to value r representing the start of the printer image representation as taken from the graphics files in which it is stored in the memory of the computing system of FIG. 1 since no compression has yet occurred. The compression process differs for thermal wax transfer printing technology and thermal dye diffusion printing technology because of the multiple dither patterns used for each color in the latter technology to provide volumetric density variation as well as areal density variation. Since only areal density variation is possible for the thermal wax transfer printing technology, no such multiple dither patterns for each color are needed.

Thus, the decision diamond in the portion of the flow chart shown in FIG. 3C determines which printing technology is being used to enter the appropriate compression process. If the thermal wax transfer printing technology is in use, the lower block in the flow chart of FIG. 3C covers the first compression step in that instance by compressing the horizontal print line representation which is formed from a horizontal row of blocks in the printer image representation assembled from the dither patterns found based on converting the single color segments described above. That is, the Boolean logic values "1" and "0" in the blocks across a horizontal line of the printer image representation, which may cross several single color printer image segments from which the dither patterns that have these blocks therein were assembled in forming the printer image representation, form a horizontal print line representation.

This horizontal print line representation is compressed to form a compressed horizontal print line representation by keeping only unrepeated bytes and a coding indication for each repeated byte in that horizontal print line representation. Once a printer image horizontal print line representation has been compressed (horizontal compression), the determination is made as to whether the compressed horizontal print line representation was the same as the preceding one in the second decision diamond shown in the flow chart portion of FIG. 3D. If so, the printer image horizontal line counter value is increased by one and the next printer image horizontal print line representation is compressed until all of the sequentially repeated lines have been compressed into a single raster graphics line (vertical compression). If the printer image horizontal print line representation compressed is not the same as the preceding one, the process moves on to store in memory a "start of raster graphics" operation indicator code sequence for the raster graphics line that include the horizontally and vertically compressed printer image horizontal print line representations and line repetition count, and further includes therein a printer image technology discrimination code. The raster graphics lines are stored in memory as indicated in the last block of FIG. 3D.

Returning to FIG. 3C, the compression process differs for the middle block representing the thermal dye diffusion printing technology in that a single heating time horizontal line representations must be formed from the blocks of each of the four binary dither patterns, obtained for each heating energy cycle for a color in assembling the printer image representation, to provide a printer image horizontal print line. The same horizontal line of blocks across each such binary dither pattern for one heating energy cycle (for one color) in the printer image representation must all be compressed to result in a compressed horizontal print line representation for color P. The determination of whether this compression is completed is made in the first decision diamond in the flow chart portion in FIG. 3B. If all the single heating time horizontal time representations have not been compressed, the process continues compressing them until a full horizontal print line representation for a single heating time horizontal line representation is provided therefor. Once a printer image horizontal print line representation is complete for this dye diffusion process, the remainder of the process is the same as that for the thermal wax transfer process in checking for repeated compressed printer image horizontal print line representations leading to vertical compression as represented in the resulting raster graphics lines.

Once a raster graphics line is stored for either printing technology, the decision diamond at the top of FIG. 3E determines whether the last printer image horizontal print line for color P has been through the compression process. If not, the process is repeated until that becomes true. At that point, the ribbon color panel counter value is incremented by one, and the second diamond decision in FIG. 3E determines whether the color panels in the ribbon color panel sequence have all had the printer image horizontal print lines corresponding thereto pass through the compression process for either of the thermal wax transfer or the thermal dye diffusion printing technologies. If not, the process continues until all of the data for all of the colors for either of the technologies has been compressed into raster graphics lines. Once this has been accomplished, there is further stored in memory a "end of graphics" operation indicator code sequence indicating the end of the printing signals, needed to control the provision of a printer image on recording sheet 21, has been reached. The printer signals representing the compressed printer image representation are then stored in the computer print spooler to wait transmission to the printing system of FIG. 2.

The operation of the printing system of FIG. 2 is controlled by microcomputer 15 in conjunction with a program stored in program memory 17 and the digital signals provided based on the compressed printer image representation transmitted from the computing system of FIG. 1, typically over a cable interconnecting these two system. These digital signals are received at input port 16 and directed by microcomputer 15 to active memory 18 for temporary storage therein after decompression. From there, the digital signals representing the data involving the printer image representation are transmitted as needed to shift registers in printhead 19 for controlling the selection of which of resistors 20 are to have current passing therethrough in the sequence of heating energy application events. The digital signals received, except for decompression (if used—the hard copy reproduction system of FIGS. 1 and 2 can be implemented without the use of data compression), are substantially ready for directing the operation of printhead 19 by being shifted into the shift register therein though there will be some delay in doing so after the digital signals are received.

Figure 9A:
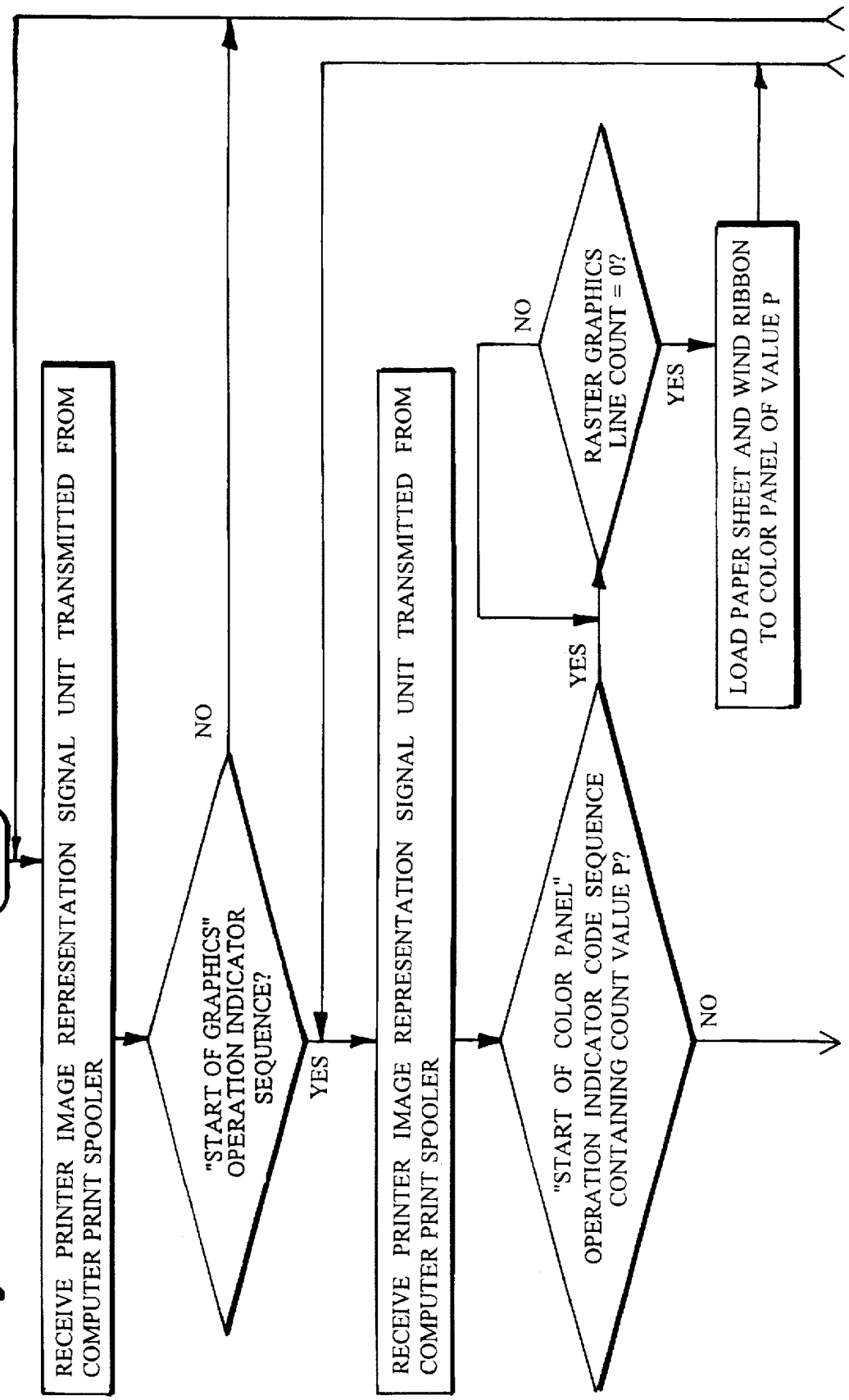
Figure 9C:
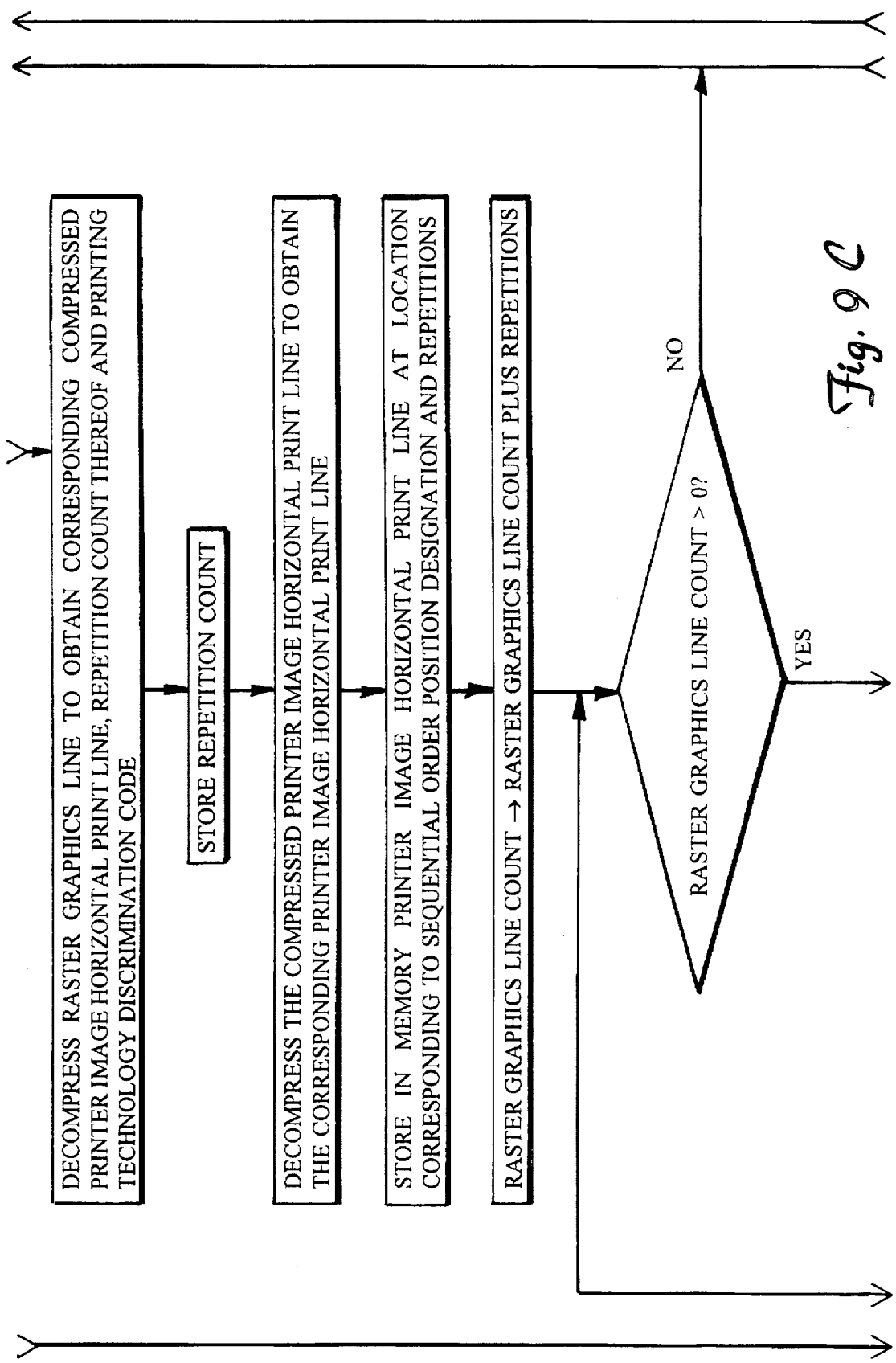

This operation of the printing system of FIG. 2 follows the flow chart of FIG. 9 having portions extending over FIGS. 9A, 9B, 9C and 9D. In the first block of FIG. 9A, the printing system of FIG. 2 receives printer image representation signal units, such as bytes of data, transmitted from the print spooler in the printing system of FIG. 2. Microcomputer 15 in the printing system of FIG. 2 reviews incoming digital signals for a "start of graphics" operation indicator code sequence as set out in the upper decision diamond of FIG. 9A. Until such a code sequence is found, the printing system does no more than wait for such a code sequence by looping back and waiting for further signal units transmitted from the print spooler.

On the other hand, once such a code sequence is detected, the printing system of FIG. 2 accepts further transmitted signal units from the print spooler as being for the process of providing a hard copy printer image on recording sheet 21 based on the digital signals representing the printer image representation stored in the computing system of FIG. 1 based on the source image. A "start of color panel" operation indicator code sequence containing the panel count value P is next to come in by the transmission and, when detected in the lower left decision diamond of FIG. 9A, a further determination is made as to whether the raster graphics line count in memory is zero. If not, the printing system waits until that last graphics line count has gone to zero indicating that the previous printing job has been completed. Once all raster graphics lines are out of memory, microcomputer 15 directs the mechanical transport systems of the printing system to load a new paper sheet as recording sheet 21, and further directs winding the ribbon to that color panel designated by a color panel count P. Once done, microcomputer 15 awaits further signal units from the computer print spooler.

If the process of printing a hard copy on recording sheet 21 is partially completed, a "start of color panel" operation indicator code sequence containing initial count value P will not be further received during that process as part of the printing signals from the computer print spooler. Instead, there may be received a "start of color panel" operation indicator code sequence containing a count value other than P as new colors are to be printed on the developing printer image, or there may be compressed printer image representation data received in the printing signals as raster graphics line signal units. Of course, if the process is over, an "end of graphics" operation indicator code sequence may be received.

If the printing signals transmitted next provide a "start of color panel" operation indicator code sequence containing a value other than P as detected in the first decision diamond in the flow chart portion in FIG. 9B, the same process steps will be repeated as were used with the operation indicator code sequence containing the count value P. That is, in a decision diamond to the right, the raster graphics line buffer count will be checked to determine when it is zero, and the system will wait until it is to be sure that the printing for the previous color is completed. Once the raster graphics line count buffer is empty of raster graphics lines, microcomputer 15 will direct the mechanical transport systems to again wind the ribbon to the color panel associated with the count value that is in the operation indicator code sequence, and to reset the paper sheet as though it were first entering the printer to align the first line of deposit coloring material to be across from printhead resistors 20. Thus, the next coloring material deposition will occur directly over the preceding coloring material deposition whether using the thermal wax transfer printing technology or the thermal dye diffusion printing technology.

As before, once these mechanical processes are completed, microcomputer 15 will again look for further transmission of signal units from the computer print spooler. After either of the "start of color panel" operation indicator code sequences, the next transmission is expected to be raster graphics line signal units containing the data necessary to provide a printer image representation on hard copy recording sheet 21 approximating that of the source image representation from which the printing signals were derived. If a raster graphics line signal unit is detected in the lower left decision diamond in FIG. 9B, a further decision diamond to the right determines whether enough signal units have been received to complete a raster graphics line. If not, microcomputer 15 awaits receiving further signal units and checks to determine when a sufficient number have been received to complete the raster graphics line.

Once a raster graphics line has been received, that line is then decompressed as indicated in the first block in the flow chart portion shown in FIG. 9C. The repetition count, if any, with the raster graphics line is stored in the next block, and then the compressed printer image horizontal print line is decompressed to obtain the corresponding printer image horizontal print line as set out in the third block in the flow chart portion shown in FIG. 9C. In the fourth block, the printer image horizontal print line is stored in the printer system memory at a location corresponding to the sequential order position designation and the repetitions set out in the stored repetition count. Finally, thereafter, the graphics line count is incremented by the number of repetitions obtained from the stored repetition count as set out in the last block in the flow chart portion shown in FIG. 9C.

Next, the raster graphics line count is checked for being greater than zero in the decision diamond at the bottom of FIG. 9C. If not, microcomputer 15 goes back to await further raster graphics signal units until a sufficient number of them accumulate to complete a raster graphics line at which point the decompression process starts again as described above. If, however, the raster graphics line count is greater than zero, the process moves on to printing through the deposition of coloring materials from ribbon 23 onto recording sheet 21. Which printing technology is being used is determined in the decision diamond at the top of the flow chart portion set out in FIG. 9D. If the printing technology discrimination code is the value set to designate thermal wax transfer, the thermal wax transfer printing operation is entered as shown by the block directly below that decision diamond. If not, the thermal dye diffusion printing operation is entered in the next block down below that decision diamond in FIG. 9D.

Figure 10A:
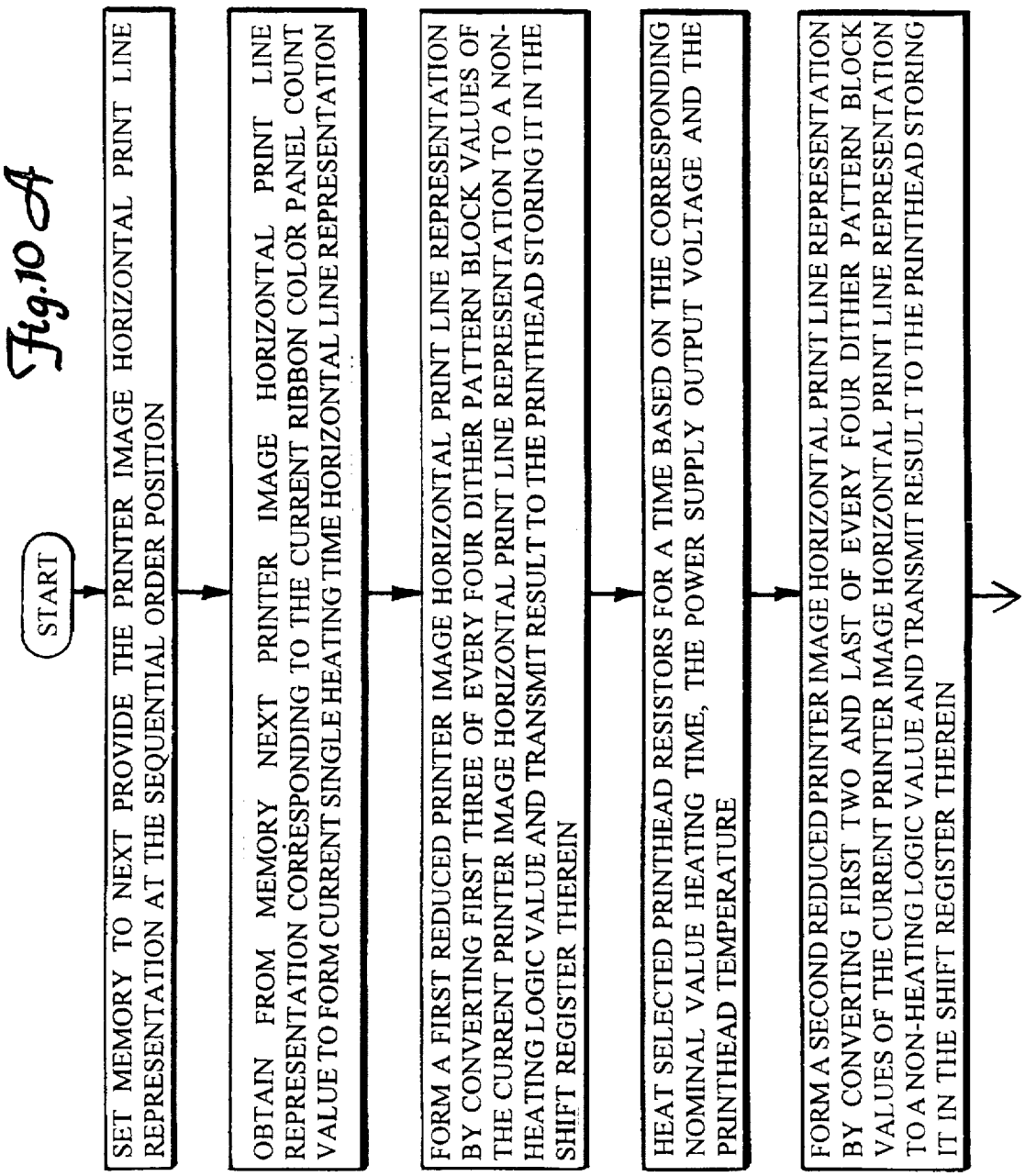

The thermal wax transfer printing operation follows the flow chart of FIG. 10 which has portions thereof extending over FIG. 10A and FIG. 10B. This operation starts by having microcomputer 15 set the memory to provide the next printer image horizontal print line representation in the sequence thereof as indicated in the first block of the flow chart portion shown in FIG. 10A. In the next block, microcomputer 15 obtains the current printer image horizontal print line representation which corresponding to the current ribbon color count value. Then a first reduced printer image horizontal print line representation is formed by converting three of every four dither pattern block values of the current printer image horizontal print line representation to a Boolean logic value "0", if not already at that value, leaving only a fourth of the block values possibly having a Boolean logic value of "1" to thus pass current through no more than one of every four resistors 20 in printhead 19. Heating no more than a fourth of the printhead resistors at a time helps to keep the average temperature of printhead 19 relatively low to avoid unwanted transfers of the wax in ribbon 23 to recording sheet 21.

Once this first reduced printer image horizontal print line representation is formed and transmitted to the shift registers in printhead 19, a heat energy application event occurs by providing current simultaneously to the selected resistors for a chosen basic heating time appropriate to the thermal wax transfer deposition process. This heating time is adjusted in view of the voltage present at the output of power supply 24 as measured by voltage sensor 25 since supply 24 is a relatively poorly regulated supply to save the cost of a high quality power supply, and in view of the temperature reached by printhead 19 as measured by temperature sensor 26.

Figure 11A:
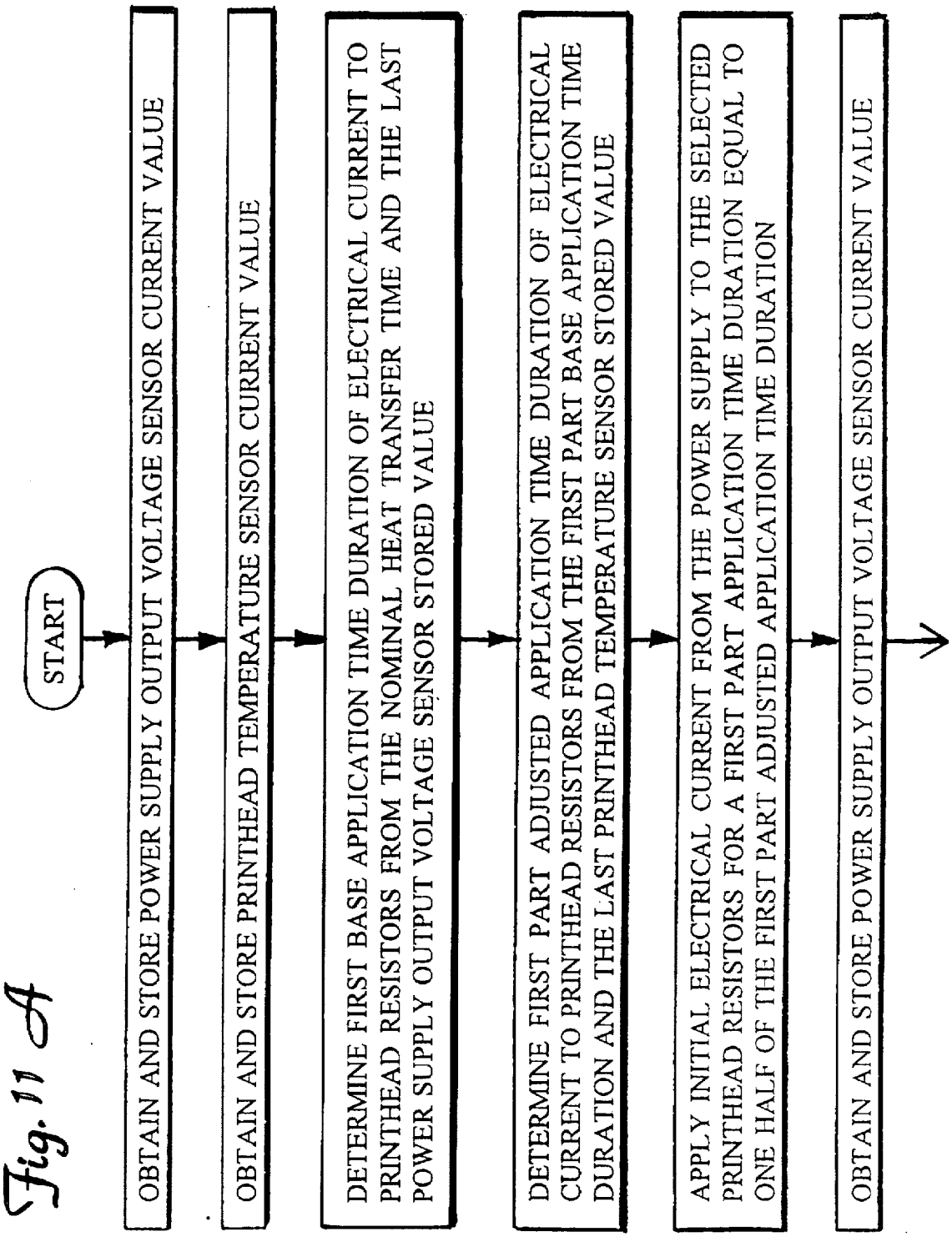
Figure 11:
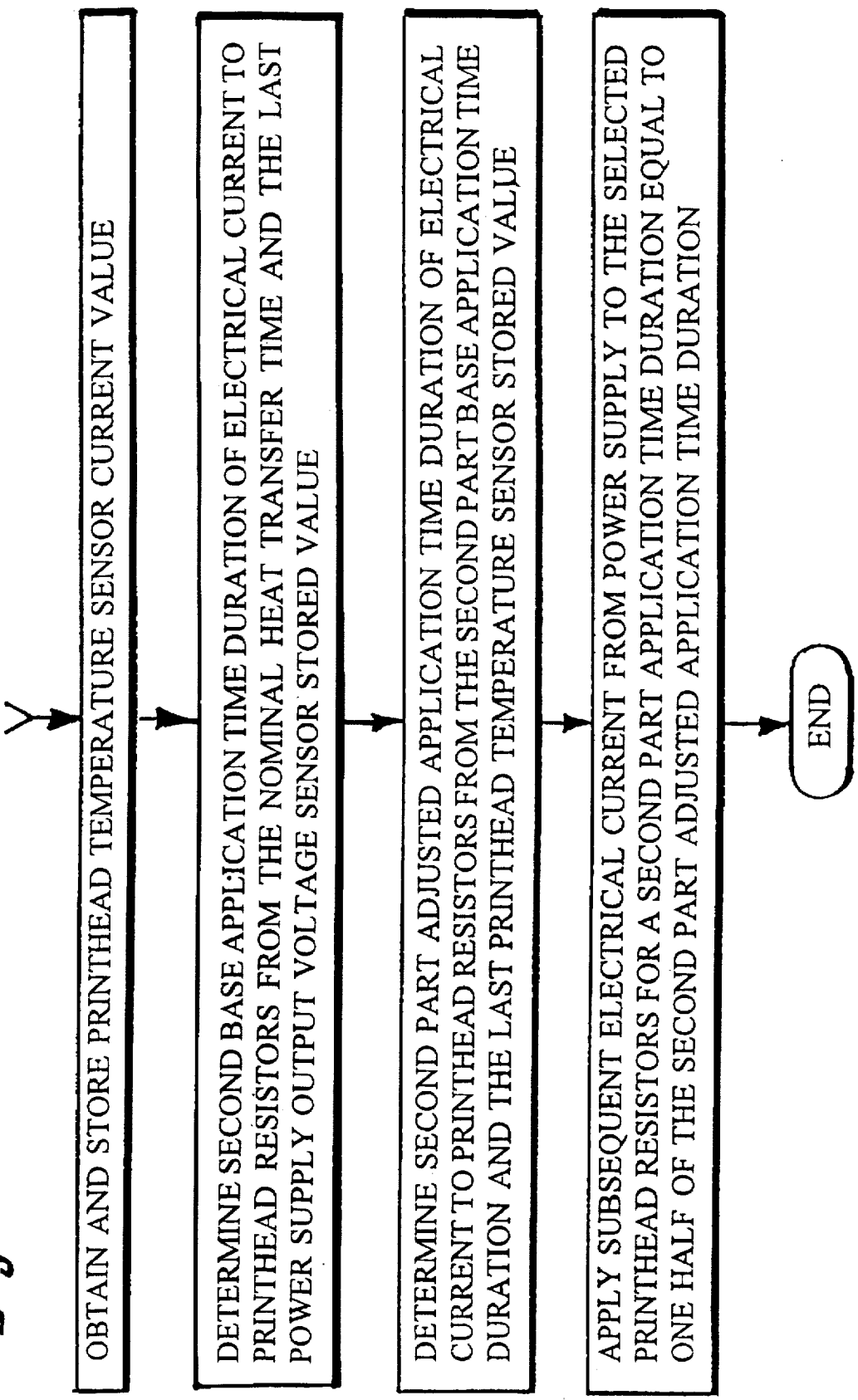

The heating energy application event indicated by the fourth block in the flow chart portion shown in FIG. 10A is shown in the flow chart of FIG. 11 which extends over both FIGS. 11A and 11B. As shown in FIG. 11A, first current voltage sensor values and temperature sensor values are obtained and stored in the memory of the printing system of FIG. 2. A first part base application time of electrical current to printhead resistors is determined from the nominal heat transfer time appropriate for a thermal wax transfer deposition process, and from the power supply output voltage value stored. A value below that associated with the nominal heat transfer time will lead to a first part base application time duration in excess of the nominal heat transfer time, and a higher voltage will lead to a shorter first part base application time duration as compared to the nominal heat transfer time. In the fourth block of FIG. 11A, a first part adjusted application time duration of electrical current to the printhead resistors is determined from the first part base application time duration and the last printhead temperature sensor stored value. Once this first part adjusted application time duration is determined, an initial electrical current from power supply 24 is provided, as indicated in the fifth block of FIG. 11A, in parallel through those resistors 20 associated with a register in the shift registers in printhead 19 that have a Boolean logic value "1" therein. Registers having a logic value "0" therein effectively prevent the associated ones of resistors 20 from having any of the initial electrical current flow therethrough.

Upon cessation of the initial electrical current after having flowed through selected ones of resistors 20 for one-half of the first part adjusted application time duration, new current values from voltage sensor 25 and temperature sensor 26 are used to determine the current duration for a subsequent electrical current flow through selected ones of resistors 20 as indicated in the last block in FIG. 11A and the first block in FIG. 11B. This is done so that any changes in the output voltage of supply 24 or the temperature of printhead 19 do not become too significant before their effect is taken into account in setting the heating energy being supplied by the selected ones of resistors 20. A second part base application time duration is determined in the second block in FIG. 11B from the nominal heat transfer time appropriate for the thermal wax transfer deposition process and from the last power supply voltage value stored as measured by sensor 25. A second part adjusted application time duration of electrical current is then determined in the third block of FIG. 11B from the second part base application time duration and the last printhead temperature value stored from sensor 26. The subsequent electrical current is supplied to the selected ones of resistors 20 for a time equal to one-half of the second part application time duration as indicated in the last block in the flow chart portion shown in FIG. 11B.

Returning now to FIG. 10, second, third and fourth reduced printer image horizontal print line representations are formed so that each of the selected ones of resistors 20 in one-fourth of those resistors can provide heat energy to ribbon 23 at the location adjacent thereto to cause a corresponding deposition of colored wax from ribbon 23 onto corresponding portions of recorder sheet 21. A heating energy application event follows each of these representations so formed which is identical in each instance to that set out in the flow chart of FIG. 11. At the end of the thermal wax transfer deposition process, recording sheet 21 is moved by the transport mechanism to a point as though it were first entering the printer, and the first line of coloring material thereon is aligned across from printhead resistors 20 to complete the thermal wax transfer printing operation for a printer image horizontal print line.

The thermal dye diffusion deposition process operation is much like that of the thermal wax transfer deposition process except for the need to have a heating energy application event for each of four single heating time horizontal line representations, and one further threshold heating energy application event, to complete the deposition of the coloring material corresponding to one printer image horizontal print line for one color of dye in a color panel in ribbon 23. The steps followed in the thermal dye diffusion deposition process are set out in the flow chart of FIG. 12 which extends over FIGS. 12A, 12B and 12C. Microcomputer 15 again sets the memory of the printing system in the first block to provide the next printer image horizontal print line representation in the sequence and sets the heating energy cycle counter to an initial value of b. In conjunction with FIG. 7, b takes the value of zero as it represents the first heating energy cycle application event as designated in that figure.

A decision diamond in FIG. 12A determines whether the heating energy cycle counter has a value equal to b+1 (or 1 using the heating energy application event designations of FIG. 7). If not, microcomputer 15 obtains from memory the next single heating time horizontal line representation obtained from the next printer image horizontal print line representation corresponding to the current value of the heat energy cycle counter which is other than b+1, and the current ribbon color panel count value to form a current single heating time horizontal line representation. If, however, the heating energy cycle counter is at a value equal to b+1, microcomputer 15 instead obtains from memory the printer image horizontal print line containing the four single heating time horizontal line representations therein, and provides a Boolean "OR" logic operation on corresponding pairs of blocks in sequence from each of these single heating time horizontal line representations. The result forms a current single heating time horizontal line representation, and has a Boolean logic value "1" in any block position therein in which there was such a value in one of the four single heating time horizontal line representations in the printer image horizontal print line representation so that there will be a threshold heat energy application event for any resistor 20 which was otherwise selected to carry a current therethrough in any of the heating energy application events corresponding to one of the four single heating time horizontal line representations.

Once such a current single heating time horizontal line representation is obtained in either of the blocks below the decision diamond in the flow chart portion shown in FIG. 12A, the process continues by again forming reduced representations that permit only fractions of resistors 20 to be selected to carry current therethrough at a time to keep the temperature of printhead 19 from rising too significantly. Thus, a right-even single heating time horizontal line representation is obtained by converting all single heating time dither pattern block values in the left half of the current single heating time horizontal line representation, and odd ones in the right half of that line representation, to a Boolean logic state value of "0" if they are not already at that value, and transmits this representation to the shift registers in printhead 19 to be stored therein. Thus, no more than a fourth of resistors 20 can be selected to permit current to flow therethrough in parallel by having registers associated therewith in the printhead shift register having a Boolean logic value of "1" provided therein.

Figure 13A:
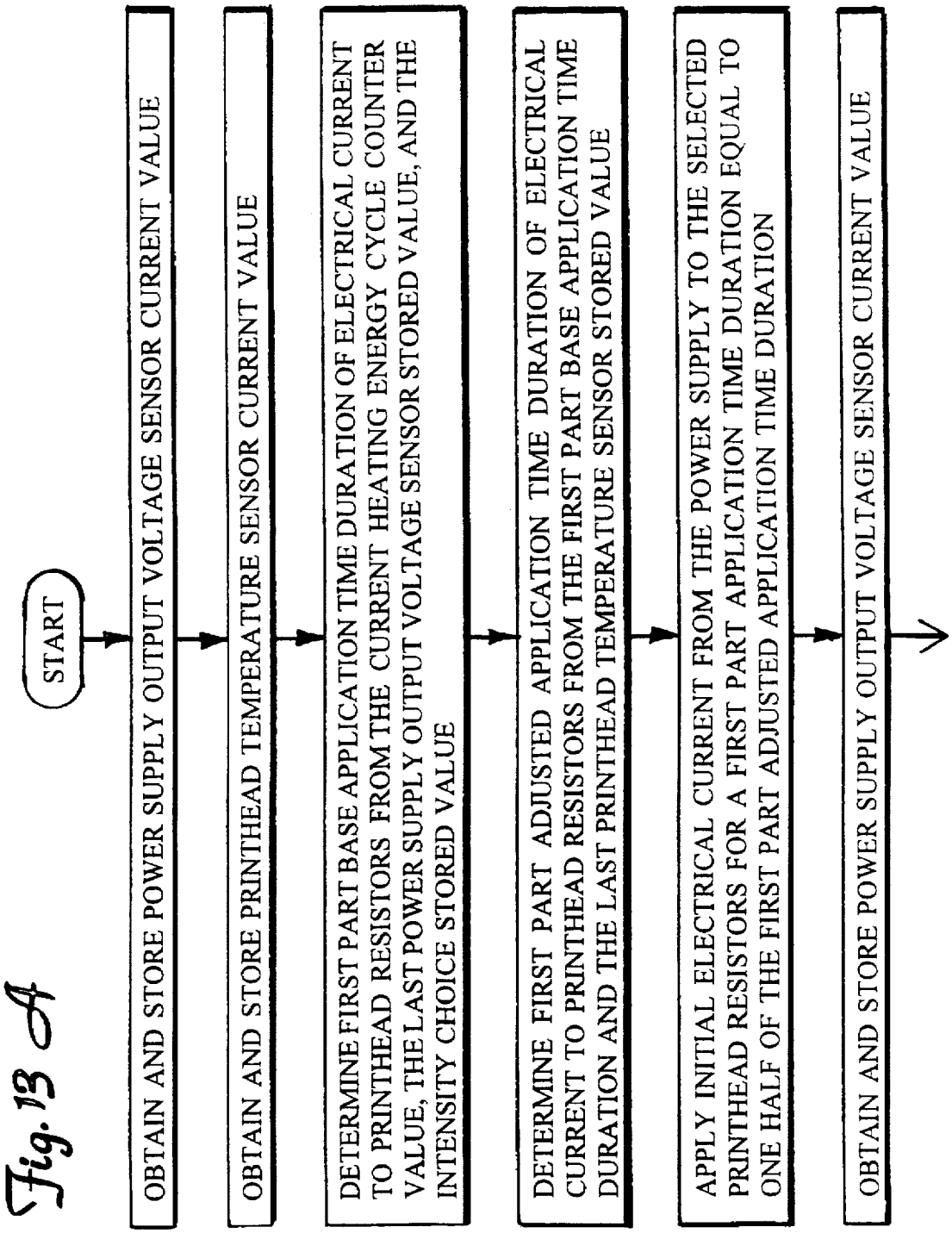

Again, a heating energy application event occurs for this representation in the shift registers of printhead 19 based on the corresponding nominal binary place value heating time, the power supply output voltage is measured by sensor 25 and the printhead temperature is measured by sensor 26. This heating energy application event follows the flow chart of FIG. 13 which extends over FIGS. 13A and 13B. The process followed in FIG. 13 is substantially just like that followed in FIG. 11 for thermal wax transfer deposition, the only difference being that the nominal heating time for the first part and second part base application time durations appropriate for a thermal wax transfer deposition process is not necessarily the time chosen for the first part and second part base application time durations in the heating energy application events for the thermal dye diffusion deposition process. Rather, the basic heating times for the first part and second part base application time durations for each heating energy application event are chosen by what is appropriate for a threshold heating energy application event in such a deposition process, and for the sequence of nominally doubling heat energy application durations as set out in FIG. 7. Thus, the first part and second part base application time durations in the flow chart of FIG. 13 depend on the current value of the energy heating cycle counter, b'.

Not only are the basic heating times for each heating energy application event subject to adjustment because of power supply voltage variation and printhead temperature variation, they are also initially adjusted to, in fact, not provide a doubling sequence of heating times (excluding the threshold heating time). That is because, in practice, the fixed cycle of heating energy application events for each colored dye to be deposited results in heat dissipation occurring between heating energy application events, as indicated above, with some combinations of heating energy application events selected at a particular resistor leading to considerably more heat dissipation at that resistor between events than other, as also described above. As a result, the basic heating times for determining the first part and second part base application time durations for the heating energy application events are chosen such that they do not form a doubling of durations sequence (again excluding the threshold heating energy application event). Instead, the ratio in the sequence is closer to 0.8, 1.8, 4.0 and 9.4. Such a relationship of basic heating times has been found effective in compensating some of the heating dissipation difficulties resulting from the fixed order of the heating energy application events given in FIG. 7. Also, the times between the occurrences of each heating energy application event are maintained substantially constant whatever the durations of the events so that the heat dissipation results remain repeatable and predictable. In other respects, the flow chart of FIG. 13 parallels that of FIG. 11 and so will not be further described again here.

Figure 12B:
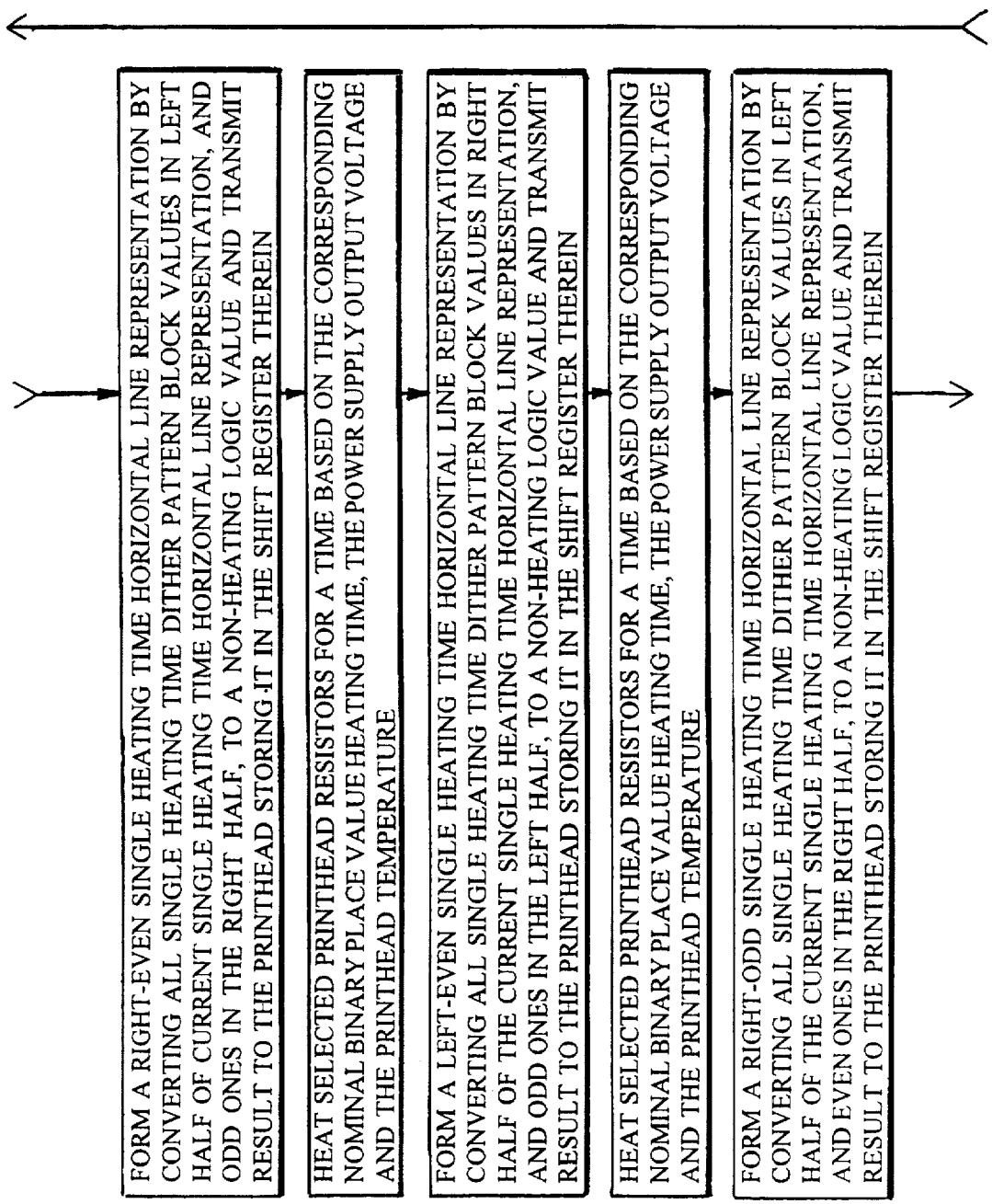
Figure 12C:
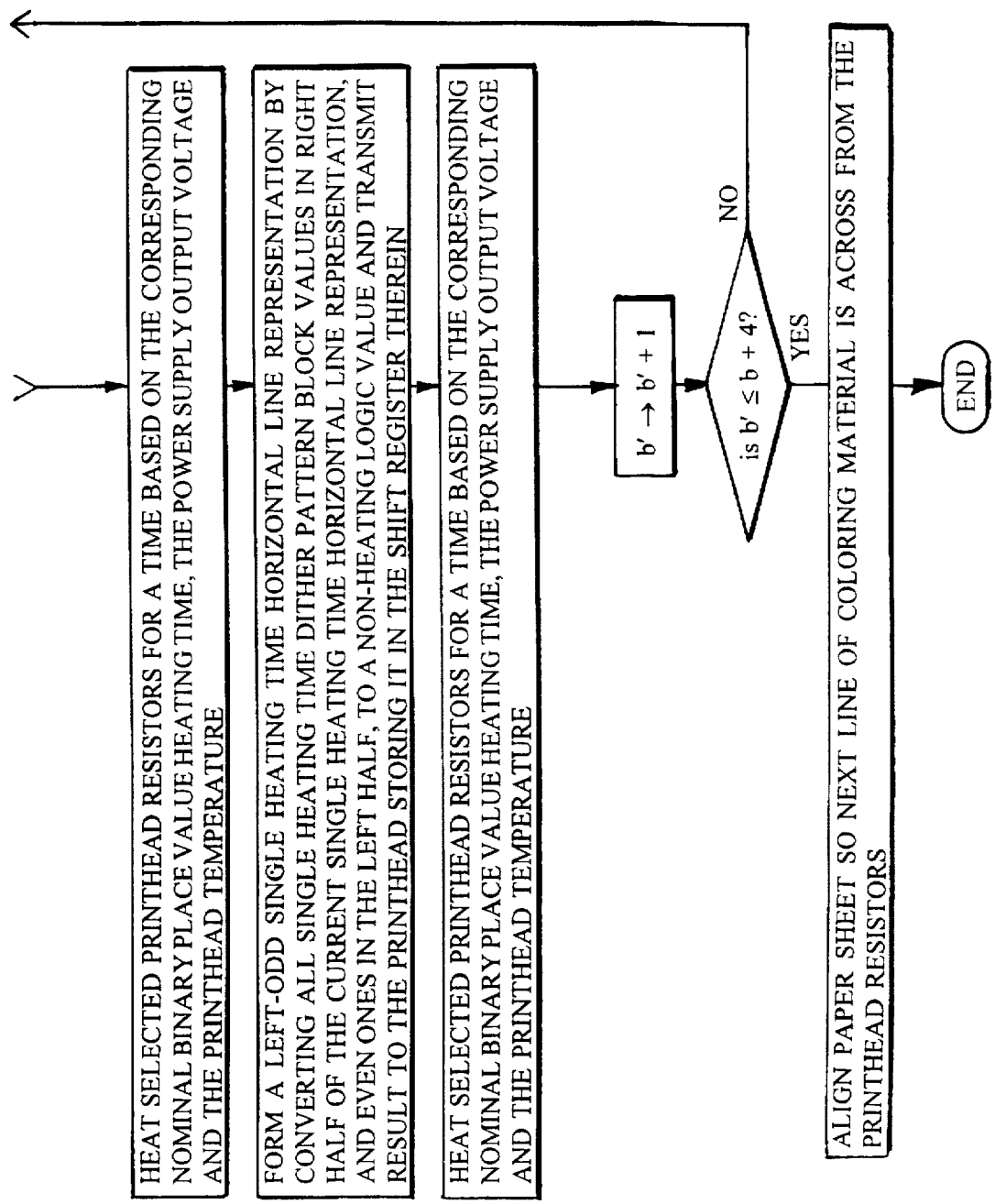

As can be seen from the remaining blocks in the flow chart portion shown in FIG. 12B, and from the first three blocks of the portion shown in FIG. 12C, the left-even, right-even, right-odd and left-odd single heating time horizontal line representations are formed in the same manner as was the right-even single heating time horizontal line representation described above. Therefore, in each instance, a corresponding part of the current heating energy application event occurs having times appropriate therein for the value of the heating energy cycle counter count which follow the steps in the flow chart of FIG. 13. Thereafter, the heating energy cycle counter is incremented by a value one and a decision diamond in the flow chart portion shown in FIG. 12C determines whether the heating energy cycle is complete for the particular color count value under which raster graphic lines are being provided from the computer print spooler. If not, the process begins again for the next heat energy application event. If so, microcomputer 15 directs the mechanical transport system to change the position of recording sheet 21 so that it is positioned as though it were to be entering the printer for the first time and to align the first line of the previously deposited coloring material to be across from the printhead resistors.

Returning now to FIG. 9D, upon completion of either of the thermal wax transfer printing operation or the thermal dye diffusion printing operation, microcomputer 15 checks for further raster graphic lines being present again through the decision diamond in FIG. 9C. This continues until all of the raster graphics lines decompressed have been printed so that the count thereof becomes zero. Once this occurs, microcomputer 15 continues to detect incoming signal units from the computer print spooler to assemble further complete raster graphics lines which are then printed in the manner described above until all of the printer image horizontal print lines for a color P or other have been printed.

Microcomputer 15 then detects further signal units from the computer print spooler to obtain the next "start of color panel" operation indicator code sequence with the next count value until each of the colors to be printed have been printed. Microcomputer 15 then detects a "end of graphics" operation indicating code sequence, waits until the raster graphics line count returns to zero, and then directs the mechanical transport mechanism to eject recording sheet 21 from the printing system of FIG. 2 thereby completing the provision of a hard copy with a printed image thereon approximating that of the source image representation stored in the computing system of FIG. 1.

Although the present invention has been described with reference to preferred embodiments, workers skilled in the art will recognize that changes may be made in form and detail without departing from the spirit and scope of the invention.

What is claimed is:

1. A printer for printing an image and a recording sheets, comprising:
   a thermal printhead having a plurality of electrical resistors providing a plurality of printhead resistor areas;
   a supply of coloring material adjacent the printhead for deposition on to the recording sheet;
   input means for receiving a binary weighted data having a plurality of discrete values related to a desired volumetric density of the coloring material to be deposited onto the recording media; and
   control means for converting the binary weighted data into an energy signal applied to an electrical resistor of the printhead thereby transferring the desired volumetric density of coloring material from the supply of coloring material to the recording sheet adjacent a resistor area providing a continuous tone printed area on the recording sheet wherein the desired volumetric density is related to duration of the energy signal as represented in the binary weighted data and each of the plurality of discrete values relate to a duration having a relationship to a duration by another discrete value selected based upon the supply of coloring material.

2. The printer of claim 1 wherein the energy signal comprises a plurality of pulses having duration related to the binary weighted data.

3. The printer of claim 1 including dither means for modulating the binary weighted data for the continuous tone printed area and at least one adjacent continuous printed area thereby selectively providing an additional continuous tone through the dithered combination of at least two adjacent printed areas.

4. The printer of claim 3 wherein a four by four matrix of continuous tone printed areas form the additional continuous tone.

5. The printer of claim 1 wherein the binary weighted data comprises four bits representative of 16 continuous tones.

6. The printer of claim 1 wherein the binary weighted data comprises a plurality of bits each representative of an energizing duration.

7. The printer of claim 6 wherein each successive energizing duration is twice as long as a previous energizing duration.

8. The printer of claim 1 including a temperature sensor providing a temperature output related to printhead temperature and wherein the control means adjusts the energy signal in response to the temperature output.

9. The printer of claim 1 including a voltage sensor providing a sensor output related to a supply voltage and wherein the control means adjusts the energy signal in responses to the sensor output.

* * * * *

UNITED STATES PATENT AND TRADEMARK OFFICE
CERTIFICATE OF CORRECTION

PATENT NO. : 5,636,331
DATED : June 3, 1997
INVENTOR(S) : Gary M. Klinefelter et al.

It is certified that error appears in the above-indentified patent and that said Letters Patent is hereby corrected as shown below:

On the title page:
    ITEM: [57] ABSTRACT:

Line 2, change "volmetric" to --volumetric--.

Signed and Sealed this

Ninth Day of September, 1997

Attest:

BRUCE LEHMAN

Attesting Officer      Commissioner of Patents and Trademarks